Aug. 22, 1961     A. M. NELSON ET AL     2,997,173
CARD PROCESSING APPARATUS

Filed Oct. 17, 1955     5 Sheets-Sheet 1

ALFRED M. NELSON
HANS M. STERN
JEROME B. WIENER
INVENTORS

BY
Ellsworth R. Roston
ATTORNEY

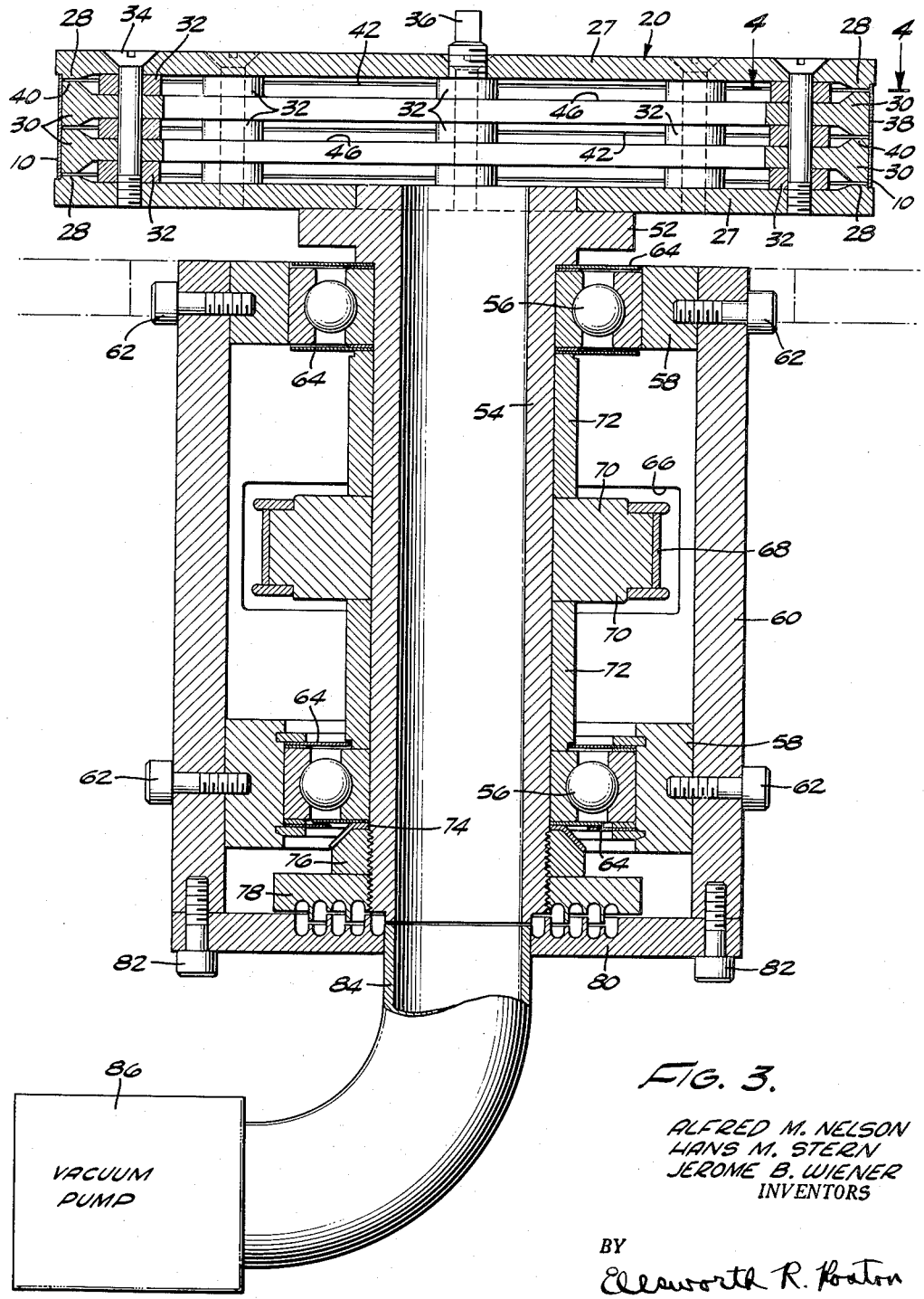

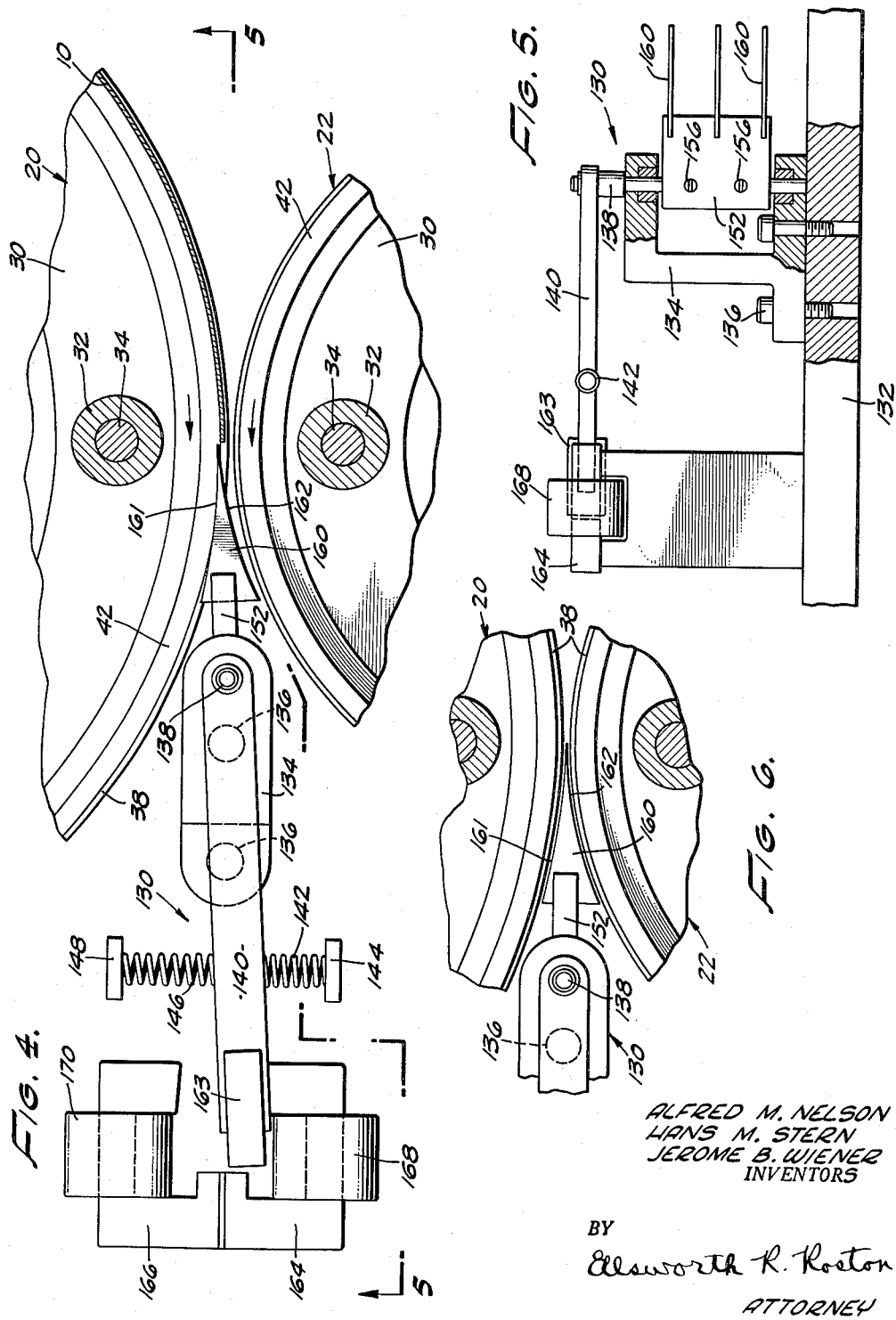

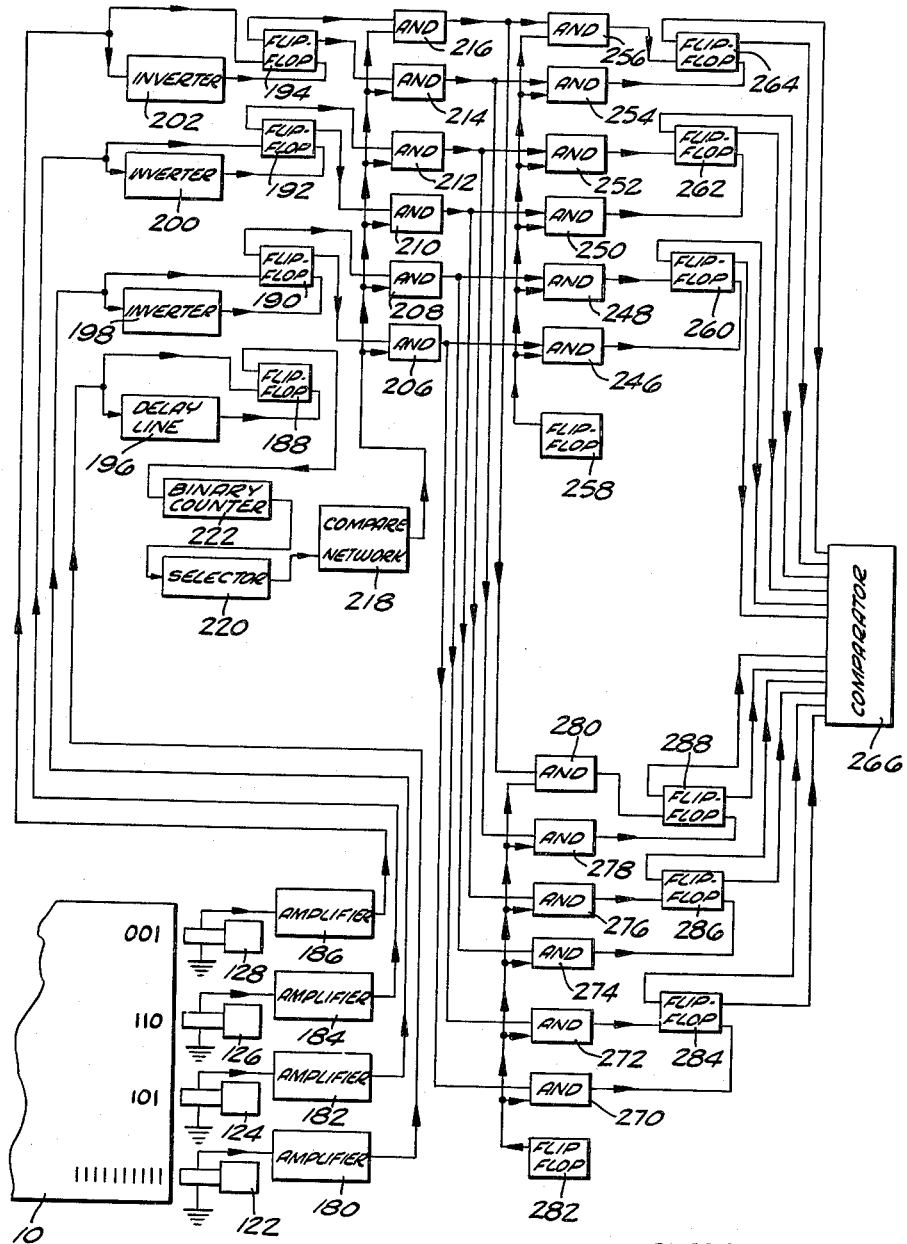

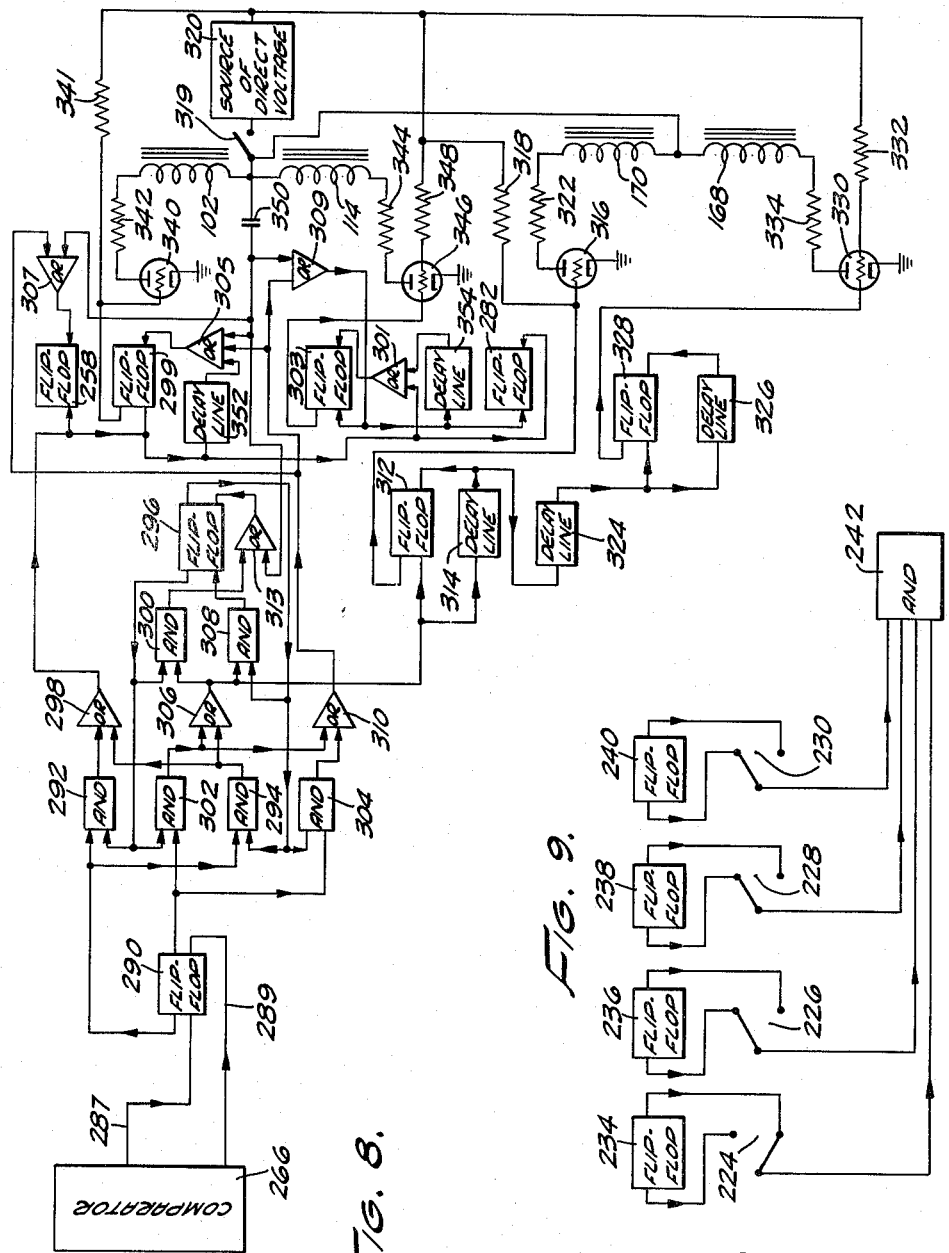

2,997,173
CARD PROCESSING APPARATUS
Alfred M. Nelson, Redondo Beach, Hans M. Stern, Los Angeles, and Jerome B. Wiener, Granada Hills, Calif., assignors to The Magnavox Company, Los Angeles, Calif., a corporation of Delaware
Filed Oct. 17, 1955, Ser. No. 540,826
34 Claims. (Cl. 209—72)

This invention relates to apparatus for processing stored information and more particularly to apparatus for processing a plurality of cards in accordance with information stored on the cards. The invention is especially concerned with apparatus for receiving information cards from two or more input stacks and merging the cards into a single stack in a logical pattern in accordance with information at particular positions on the cards.

In recent years, digital computers and data processing systems have been built for a wide variety of purposes. For example, digital computers have been built to solve complex mathematical problems. Data processing systems have also been built to solve problems in the scientific field and have been built to automatically perform procedures of a complex nature in the business world. By way of illustration, data processing systems have been built or are being built to make automatic certain operations in a department store such as the control of inventory. The data processing system accomplishes this by recording at the time of sale each item sold in the department store and maintaining a record of the number of models of that item still available in the store.

In one type of data processing system, information has been stored on a plurality of cards. Although a considerable number of information bits can be stored on each card, a large number of cards have had to be used. This has been especially true because of the considerable amount of information which has had to be stored in such data processing systems. For example, sometimes as many as hundreds of thousands of cards may be required to store and process all of the necessary information. Because of the large number of cards required, it has been difficult to merge the various cards into a single stack on a logical basis, especially when the cards have been separated into two or more input stacks. If the cards are not merged properly into a single stack so that the information in the cards is presented in a logical pattern, the efficiency in the operation of the card processing system becomes impaired.

This invention provides apparatus which overcomes the above difficulties by merging the cards from two or more input stacks. The invention includes a first drum for receiving the cards from the input stacks. As the cards travel along the first drum, the signal information at particular positions on the cards is decoded and compared with the information at the same positions on a previous card. One of the two cards being compared is then passed to an output stack in accordance with the relative decoded information on the cards.

The invention includes a second drum disposed in contiguous relationship to the first drum to provide a coupling with the first drum. A pivotable gate is disposed between the first and second drums at the position of drum contiguity. The gate is pivotable into a first position to provide a transfer of a card from the first drum to the second drum for circulation on the second drum. The gate is pivotable into a second position to provide a transfer of a card from the second drum to the first drum and past the second drum to an output stack. The gate is also pivotable into a third position to uncouple the first and second drums so that a card traveling on the first drum can pass to the output stack. When the gate is pivoted to the third position, any card already on the second drum continues to circulate on the drum.

The invention also includes electrical circuitry for controlling the movement of the gate into its different pivotal positions. The invention provides this control in accordance with the decoded signal information on the different cards so that the cards will pass to the output stack in a sequence representing the collection of the cards in a logical information pattern. Means are also associated with the electrical circuitry for providing a transfer of a subsequent card from a particular one of the information stacks upon each passage of a card to the output stack. A card is transferred to the first drum from a particular input stack in accordance with the passage of a particular card to the output stack. In this way, each card collected at the output stack is replaced by a new input card so that a comparison can always be made between a pair of cards for purposes of collection in an orderly sequence at the output stack.

An object of this invention is to provide a merging system for combining the cards into two or more input stacks into a single output stack in accordance with the signal information at particular positions on the cards.

Another object is to provide a merging system for providing a pair of drums which are adapted to receive cards from the different input stacks and to co-operate with a pivotable gate so as to pass the cards on a selective basis to the output stack.

A further object is to provide a merging system including a gate pivotable into a plurality of different positions to control the passage of the cards to the output stack.

Still another object is to provide a merging system which includes electrical circuitry for controlling the operation of the pivotable gate and associated components in accordance with the signal information at selected positions on the cards so as to obtain a passage of the cards to the output stack in a logical pattern.

A still further object is to provide a merging system for obtaining a transfer of a card from the input stacks to the first and second drums every time that a card is transferred from the drums to the output stack so that a continuous and reliable merging operation can be obtained.

Another object is to provide electrical circuitry and associated apparatus for obtaining a transfer of a card from a particular one of the input stacks upon each transfer of a card to the output stack and in accordance with the transfer of the particular card to the output stack.

Other objects and advantages will be apparent from a detailed description of the invention and from the appended drawings and claims.

In the drawings:

FIGURE 3 is an enlarged sectional view substantially on the line 3—3 of FIGURE 1 and illustrates in further detail the construction of one of the drums forming a part of the embodiment shown in FIGURE 1;

FIGURE 4 is an enlarged fragmentary sectional view substantially on the line 4—4 of FIGURE 3 and shows in further detail the construction and relative disposition of the pivotable gate and a pair of drums associated with the gate when the gate has been pivoted into one of its operative positions;

FIGURE 5 is a fragmentary sectional view substantially on the line 5—5 of FIGURE 4 and illustrates in further detail the construction of the pivotable gate shown in FIGURE 4;

FIGURE 6 is an enlarged fragmentary view similar to that shown in FIGURE 4 and illustrates the disposition of the gate relative to the associated drums in the neutral position of the gate;

FIGURE 7 is a diagram, partly in block form, somewhat schematically illustrating certain electrical circuitry for controlling the operation of the apparatus shown in the previous figures;

FIGURE 8 is a diagram, partly in block form, somewhat schematically illustrating certain electrical circuitry for operating in conjunction with the circuitry shown in FIGURE 7 to control the operation of the apparatus shown in FIGURES 1 to 6, inclusive;

FIGURE 9 is a diagram, partly in block form, somewhat schematically illustrating in further detail certain of the stages shown schematically in block form in FIGURE 6.

Figure 1:
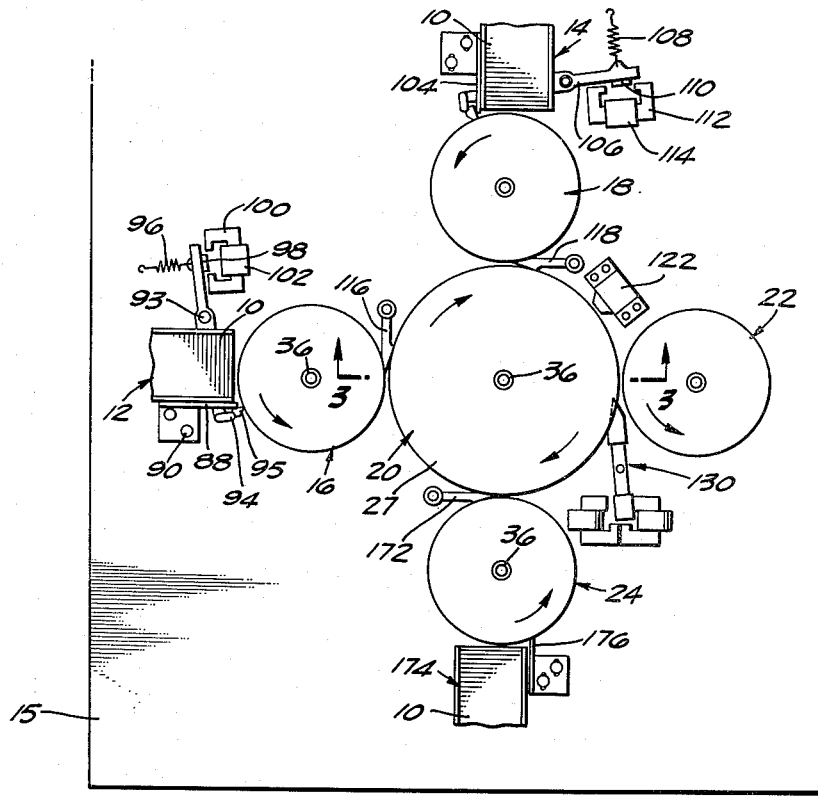
FIGURE 1 is a top plan view of merging apparatus constituting one embodiment of this invention and includes a plurality of drums and at least one pivotable gate associated with the drums for controlling the transfer of information cards from at least a pair of information stacks to a single output stack.

In the embodiment of the invention shown in the drawings, a plurality of cards 10 (FIGURE 1) are disposed in a plurality of stacks such as stacks 12 and 14. The bottom edge of each card is adapted to rest on a flat surface such as the top of a table 15. The faces of each card are disposed in a substantially vertical plane extending in either a lateral or longitudinal direction along the top of the table 15. The faces of the cards in the stack 12 are shown as extending laterally in FIGURE 1, and the faces of the cards in the stack 14 are shown as extending in a longitudinal direction in FIGURE 1.

As shown in FIGURE 7, each card 10 is provided with a plurality of bits of information. Each bit of information by itself or in combination with other bits represents information in digital form. This information may relate to numbers, alphabetical letters, combinations of numbers and letters (alpha-numeric coding) or any other pertinent matter. The bits of information may be disposed in rows each of which extends in a direction substantially parallel to the top of the table 15. Because of the different angle at which one of the cards 10 is shown in FIGURE 7, the rows are shown as extending horizontally in that figure.

The bits of information may be provided in any suitable form on the card 10. For example, the information may be represented by holes or the absence of holes at the different positions. Preferably, the information is represented in magnetic form. In this form, magnetic fluxes of one polarity at a position may represent an indication of "0" or a "false" state and magnetic fluxes of an opposite polarity at a position may represent an indication of "1" or a "true" state. Preferably, the information is also recorded in binary form on each card.

Either one face of each card 10 may be magnetically polarized in the different information positions to represent various bits of binary information or both faces may be magnetically polarized in this manner. By polarizing both faces of each card, the number of cards required to store a particular amount of information can be substantially halved. The information on one side of the card will not interfere with the information on the other side of the card if the card is sufficiently thick.

A plurality of drums are disposed relative to one another and to the cards in the input stacks 12 and 14 such that the cards can be withdrawn from each input stack for movement on particular ones of the drums. The drums in the plurality are indicated at 16, 18, 20, 22 and 24 and are provided with similar constructions. For this reason, the construction of the drum 20 is shown in detail in FIGURE 3 and will be described fully subsequently. It is believed that the description relating to the construction of the drum 20 should indicate the construction of the other drums shown in FIGURE 1 because of the similarity of all of the drums.

The drum 20 includes a pair of exterior plates 27 (FIGURE 3) defining a housing and having inwardly disposed lip portions 28 at their peripheries. A second pair of plates 30 are disposed within the compartment defined by the plates 27 and are suitably disposed in spaced relationship to the plates 27 as by spacers 32 mounted on studs 34. The studs 34 extend through the plates 27 and 30 at positions near the peripheries of the plates to maintain the plates in fixed position relative to one another. A plug 36 also extends into a threaded socket in the upper plate 27 at the annular center of the plate.

The radius of the plates 30 is slightly less than that of the plates 27 by a distance corresponding substantially to the thickness of the cards 10 so as to form a neck portion 38 relative to the periphery of the plates 27. Each of the plates 30 has annular flange portions 40 extending axially from both faces of the plate 30 at the periphery of the plate. The flange portions 40 are so formed as to produce slots 42 between the plates 30 and between the flanges on the plates 30 and the lip portions 28 on the plates 27. The slots 42 communicate with suction passageways 46 formed between adjacent plates by the inclusion of the spacers 32.

The drum 20 is disposed against an annular collar 52 provided at one end of a hollow shaft 54. Bearings 56 are provided at opposite ends of the shaft 54. The inner races of the bearings 56 are mounted on the shaft and the outer races of the bearings are disposed against bushings 58 secured to a housing 60 as by studs 62. Seals 64 are disposed at opposite ends of the bearings to prevent the leakage of lubricating fluid from the bearings.

A hole 66 is provided in the housing 60 at a position between the bearings 56. The hole 66 is provided so that a belt 68 can extend into the housing and around a pulley 70. The pulley 70 is suitably positioned within the housing 60 as by sleeves 72 mounted on the shaft 54 between the bearings 56. In this way, the shaft 54 can be rotated by a suitable motor (not shown).

The bearings 56 and the sleeve 72 are maintained in fixed position on the shaft 54 as by a lock washer 74 and a nut 76. The nut 76 is adapted to be screwed on a threaded portion at the bottom of the shaft 54. A sealing disk 78 is also adapted to be screwed on the threaded portion of the shaft 54. The sealing disk 78 operates in conjunction with a bottom plate 80 to prevent movement of air between the interior of the housing 60 and the interior of the hollow shaft 54 upon a difference in pressure between the housing and the shaft.

The plate 80 is secured to the housing 60 as by studs 82. A hollow conduit 84 is in turn disposed by a push-fit within the plate 80. In this way, air can be exhausted from the hollow interiors of the shaft 54 and the conduit 84 as by a vacuum pump 86. Although the pump 86 is shown in block form in FIGURE 3, it should be appreciated that any suitable type of pump can be used.

The drum 16 is disposed in frictional relationship with the cards 10 at one end of the stack 12 such as the right end in FIGURE 1. This frictional relationship may be obtained at least in part by the vacuum produced on the periphery of the drum 16. A throat member 88 is disposed in contiguous relationship to the periphery of the drum 16. The throat member 88 is disposed at a position near the stack 12 but angularly removed from the stack in the direction of rotation of the drum. When the drum 16 rotates in a counterclockwise direction as shown in FIGURE 1, the throat member 88 is displaced in a counterclockwise direction from the stack 12. The throat member 88 is adjustably positioned relative to the periphery of the drum as by elongated slots and screws 90 extending through the slots into the table 15.

A bar 92 is pivotable on a pin 93 to a position overhanging the throat member 88. The bar 92 carries at one end a support member 94 which in turn carries fingers 95 adapted to fit within the slots 42 in the associated drum 16. The fingers 95 may be similar to those shown in FIGURES 4, 5 and 6 and hereinafter to be described in detail. The bar 92 is normally disposed in a position providing a coupled relationship between the fingers 95 and the slots 42 in the drum 16. The disposition of the fingers 95 in the slots 42 is obtained by the operation of a spring 96 disposed at the end of the bar removed from the throat member. As will be described in detail subsequently, the bar 92 carries an armature 98 disposed in magnetic proximity to a magnet 100. The magnet 100 is adapted to be energized by a coil 102 suitably wound on the magnet so as to pivot the bar 92 in a direction opposite to the action of the spring 96 on the bar.

In like manner, a throat member 104 is disposed in contiguous relationship to the drum 18 at a position removed from the stack 14 in the direction of rotation of the drum. This would cause the throat member 104 to be angularly displaced from the stack 14 in a clockwise direction since the drum 18 rotates in this direction. The throat member 104 is adjustably positioned relative to the drum 18 in a manner similar to that described above for the throat member 88.

A bar 106 is pivotably disposed relative to the throat member 104. A spring 108 is adapted to act on the bar 106 to pivot the bar in a direction for preventing the passage of cards on the drum 18 past the throat member 104, as by the disposition of fingers in the slots of the drum in a manner similar to that shown in FIGURE 2. An armature 110 is carried by the bar 106 and is associated with a magnet 112 and a coil 114 wound on the magnet to produce a pivotal movement of the bar away from the throat member 104 when the coil 114 is energized.

The drum 20 is disposed in contiguous relationship to the drums 16 and 18. A gate 116 is fixedly disposed between the drums 16 and 20 at the position of the drum contiguity. Although a fixed gate similar to the gate 116 is not shown in detail in the drawings, it may be deduced by a person skilled in the art from the construction of one of the pivotable gates shown in FIGURES 4, 5 and 6. The construction and operation of a gate similar to the gate 116 is also shown in detail in co-pending application Serial No. 505,248, filed May 2, 1955 by Alfred M. Nelson and Hans M. Stern.

In like manner, the drum 20 is disposed in contiguous relationship to the drum 18. The drum 20 is contiguous to the drum 18 at a position removed from the drum 16 in the direction of movement of the drum 20. Since the drum 20 is rotating in a counterclockwise direction, the drum 18 is displaced along the drum 20 in a clockwise direction relative to the disposition of the drum 16. A gate 118 corresponding in construction to the gate 116 extends to a position between the drums 18 and 20 at the position of the drum contiguity.

As shown in FIGURES 1 and 7, a plurality of transducing members are disposed in contiguous relationship to the drum 20. Four transducing members are indicated at 122, 124, 126 and 128 in FIGURES 1 and 7 but it should be appreciated that any other number of transducing members can be used in accordance with the number of different horizontal rows of information on the cards 10. The transducing members such as the members 122, 124, 126 and 128 are disposed in contiguous relationship to the periphery of the drum 20 at an angular position removed from the drums 16 and 18 in the direction of rotation of the drum 20. In FIGURE 1, the transducing member 122 is shown as being displaced in a clockwise direction from the drums 16 and 18.

Each of the transducing members such as the members 122, 124, 126 and 128 is provided with magnetic means such as a coil. The coil in each transducing member is so disposed as to be coupled to the cards 10 during the movement of the cards past the transducing member on the periphery of the drum 20. As will be described in detail subsequently, the transducing members 122, 124, 126 and 128 are connected to "read" the magnetic indications on the different cards and to convert these magnetic indications into a corresponding pattern of electrical signals.

The transducing members 122, 124, 126 and 128 or other similar members may also be connected to record magnetic information on the cards 10 by converting electrical signals into a corresponding pattern of magnetic signals on the cards. Transducing members are shown in the drawings as being associated only with the drum 20. However, other transducing members may be associated with any or all of the other drums as described in co-pending application Serial No. 505,248, filed May 2, 1955 by Alfred M. Nelson and Hans M. Stern.

A gate generally indicated at 130 in FIGURES 4, 5 and 6 is disposed in contiguous relationship to the drums 20 and 22. The gate 130 is disposed relative to the drum 20 at a position removed from the transducing members 122, 124, 126 and 128 in the direction of rotation of the drum. Since the drum 20 is shown in FIGURE 1 as rotating in a clockwise direction, the gate 130 is displaced in this direction from the transducing members 122, 124, 126 and 128. The gate 130 is pivotable into three different positions in a manner which will be described in detail subsequently.

As shown in FIGURES 4, 5 and 6, the gate 130 includes a base 132 (FIGURE 5) which supports a C-shaped brace 134 as by threaded studs 136. A pivot pin 138 extends through a rod 140 and through the horizontal legs of the brace 134. A first spring 142 is supported between the rod 140 and a fixed wall such as that indicated at 144 in FIGURE 4. Similarly, a second spring 146 is supported between the rod 120 and a fixed wall 148. The springs 142 and 146 are disposed on opposite sides of the rod 140 so that one of the springs will be subjected to tension by a lateral movement of the rod 140 at the same time that the other spring is subjected to a compressional force.

A post 152 is fixedly positioned on the pivot pin 138 as by studs 156 which screw into the post to press against the pin. At its outer end, the post 152 supports fingers 160 which taper inwardly as they extend from the post. The fingers 160 taper as at 161 on one side and as at 162 on the opposite side, preferably on a symmetrical basis. In this way, the fingers 160 may be disposed to provide a coupling from the drum 20 in one pivotable position to the drum 22 in a manner similar to that shown in FIGURE 4. In a second pivotable position, the fingers 160 may be disposed to provide a coupling from the drum 22 to the drum 20. This will be described in detail subsequently.

The rod 140 carries at its left end an armature 163. The armature 163 is positioned in magnetic proximity to a magnet 164 to obtain a pivotal movement of the rod 140 in a counterclockwise direction when the magnet is energized. In like manner, the armature 163 is positioned in magnetic proximity to a magnet 166 to produce a pivotal movement of the rod 140 in a clockwise direction when the magnet is energized. The magnets 164 and 166 are respectively adapted to be energized by coils 168 and 170 suitably wound on the magnets.

A fixed gate 172 (FIGURE 1) is disposed between the drums 20 and 24 at the position of drum contiguity. The fixed gate 172 is disposed at a position removed from the gate 130 in the direction of rotation of the drum 20. This corresponds to a clockwise direction in FIGURE 1. An output stack 174 is positioned in contiguous relationship to the periphery of the drum 24 in a counterclockwise direction along the drum with respect to the disposition of the gate 172. A stop 176 is also associated with the drum 24 and the output stack 174 in abutting relationship to the drum 24 to prevent the movement of cards on the drum past the stop. The stop 176 is slightly removed from the stack 174 in a counterclockwise direction. This corresponds to the direction of movement of the drum 24. Although only one output stack and associated components are shown, it should be appreciated that more than one output stack can also be used.

In FIGURES 7 to 9, inclusive, electrical circuitry is shown for controlling the operation of the magnetic members shown in FIGURES 1 to 6, inclusive, and described above. The electrical circuitry includes the transducing members such as the heads 122, 124, 126 and 128 which are disposed in magnetic proximity to each of the cards 10 as the cards move with the drum 20 during the drum rotation. The output signals from the transducing members such as the members 122, 124, 126 and 128 are introduced to amplifiers such as amplifiers 180, 182, 184 and 186 in FIGURE 7.

The output signals from the amplifiers such as the amplifiers 180, 182, 184 and 186 are introduced to corresponding input terminals of flip-flops such as flip-flops 188, 190, 192 and 194. The flip-flops may be constructed in a manner similar to that described on pages 164 to 166, inclusive of volume 19 entitled "Wave Forms" of the Radiation Laboratory Series published in 1949 by the Massachusetts Institute of Technology. Each of the flip-flops may be provided with two input terminals designated for convenience as the left and right input terminals. The output signals from the amplifiers 180, 182, 184 and 186 are shown as being respectively introduced to the left input terminals of the flip-flops 188, 190, 192 and 194.

The output signals from the amplifier 180 are also introduced through a delay line 196 to the right input terminal of the flip-flop 188. The delay line 196 is adapted to provide a delay equal to substantially one half of the time required for adjacent vertical columns on the cards 10 to move past the heads such as the heads 122, 124, 126 and 128. The purpose of the delay line 196 is to provide clock signals in the flip-flop 188 as will be described in detail subsequently. The output signals from the amplifiers 182, 184 and 186 are also respectively introduced through inverters 198, 200 and 202 to the right input terminals of the flip-flops 190, 192 and 194. The inverters 198, 200 and 202 may be conventional amplifier circuits adapted to invert the polarity of the signals introduced to them. The inverters 198, 200 and 202 and the other inverters in the application may be constructed in a manner similar to that shown in FIGURES 1–3 and described on page 10 of volume 19 entitled "Wave Forms" of the Radiation Laboratory Series prepared by the Massachusetts Institute of Technology (published by the McGraw-Hill Book Company, Inc. of New York, New York in 1949).

The flip-flops such as the flip-flops 188, 190, 192 and 194 also have two output terminals designated for convenience as the left and right output terminals. In FIGURE 7, the right and left output terminals of the flip-flops 190, and 192 and 194 are respectively shown as being introduced to input terminals of "and" networks 206 and 208, networks 210 and 212 and networks 214 and 216. Each of the "and" networks such as the "and" networks 206, 208, 210, 212, 214 and 216 also has a second input terminal connected to the output terminal of a compare network 218, one form of which will be described in some detail subsequently. The "and" networks such as the networks 206, 208, 210, 212, 214 and 216 may be constructed in a manner similar to that shown in FIGURE 2–2 and described on page 32 of "Arithmetic Operations in Digital Computers" by R. K. Richards (published by D. Van Nostrand Co. Inc. of Princeton, New Jersey in 1955).

Connections are made to the input terminal of the selector 220 from an output terminal of the binary counter 222 and to the input terminal of the compare network 218 from the output terminal of the selector 220. One embodiment of the compare network 218, the selector 220 and the binary counter 222 are shown in FIGURE 9. The selector 220 may be formed from a plurality of single-pole, double-throw switches such as switches 224, 226, 228 and 230 in FIGURE 9. The switches such as the switches 224, 226, 228 and 230 may be pre-set into a particular pattern of operation by setting the movable contacts of the switches. For example, the movable contact of the switch 224 may be set into engagement with the lower stationary contact of the switch in a manner similar to that shown in FIGURE 9. Similarly, the movable contacts of the switches 226, 228 and 230 may be set into engagement with the upper contacts of the switches shown in FIGURE 9. The movable contacts of the switches 224, 226, 228 and 230 may be set in a particular pattern corresponding to the particular vertical column to be selected on each card 10 for reading.

The counter 222 in FIGURE 7 may be formed from a plurality of flip-flops such as flip-flops 234, 236, 238 and 240 in FIGURE 9. The flip-flops such as flip-flops 234, 236, 238 and 240 may be connected in a conventional manner in a cascade arrangement. In such an arrangement, each flip-flop is adapted to be triggered by a signal from the preceding flip-flop. When the preceding flip-flops are operated in a particular pattern, the first flip-flop 234 in the cascade arrangement is adapted to be triggered by each signal from the flip-flop 188 in FIGURE 7 in accordance with the connection shown in that figure.

The flip-flops 234, 236, 238 and 240 are respectively associated with the switches 224, 226, 228 and 230. For example, the left output terminal of each flip-flop is connected to the upper stationary contact of its associated switch in FIGURE 9. Similarly, a connection is made in FIGURE 9 from the right output terminal of each flip-flop to the lower stationary contact of the associated switch. The voltages on the movable contacts of the switches 224, 226, 228 and 230 are applied to input terminals of an "and" network 242 in FIGURE 9.

The output signals from the "and" networks 206, 208, 210, 212, 214 and 216 in FIGURE 7 are respectively introduced to input terminals of "and" networks 246, 248, 250, 252, 254 and 256. Another input terminal of each of the "and" networks 246, 248, 250, 252, 254 and 256 is connected to the left output terminal of a flip-flop 258 also shown in FIGURE 8. Connections are respectively made from the output terminals of the "and" networks 248 and 246 to the left and right input terminals of a flip-flop 260; from the output terminals of the "and" networks 252 and 250 to the left and right input terminals of a flip-flop 262; and from the output terminals of the "and" networks 256 and 254 to the left and right input terminals of a flip-flop 264.

The voltages on the left and right output terminals of the flip-flops 260, 262 and 264 pass to input terminals of a comparator 266 also shown in FIGURE 8. The comparator 266 is shown in block form for purposes of simplicity. Actually, the comparator 266 is formed from a plurality of "and" and "or" networks interrelated in a logical pattern in accordance with a logical equation which will subsequently be set forth in detail. The comparator 266 may also be constructed in a manner similar to that shown in FIGURES 3d and 3e of Phelps Patent 2,602,544 and described in detail in columns 19–27 inclusive of that patent. The comparator 266 may also be constructed in a manner similar to that taught by Knutsen Patent 2,712,898 in combination with Phelps Patent 2,602,544.

The signals from the "and" networks 206, 208, 210, 212 214 and 216 not only pass to the "and" networks 246, 248, 250, 252, 254 and 256 but also to "and" networks 270, 272, 274, 276, 278 and 280, respectively. Other input terminals of the "and" networks 270, 272, 274, 276, 278 and 280 are connected to the left output terminal of a flip-flop 282 also shown in FIGURE 8. Actually, the flip-flops 258 and 282 can be replaced by a single flip-flop in which one output terminal is connected to the "and" networks 246, 248, 250, 252, 254 and 256 and the other output terminal is connected to the "and" networks 270, 272, 274, 276, 278 and 280. However, both of the flip-flops 258 and 282 are included for the purposes of facilitating an understanding of the subsequent discussion.

Connections are respectively made from the "and" networks 270 and 272 to the right and left input terminals of a flip-flop 284; from the "and" networks 274 and 276 to the right and left input terminals of a flip-flop 286; and from the "and" networks 278 and 280 to the right and left input terminals of a flip-flop 288. The voltages on the left and right output terminals of the flip-flops 284, 286 and 288 are introduced to input terminals of the comparator 266.

Output signals from the comparator 266 are respectively introduced through lines 287 and 289 in FIGURE 8 to the left and right input terminals of a flip-flop 290. The left output terminal of the flip-flop 290 has a common connection with input terminals of "and" networks 292 and 294. Other input terminals of the "and" networks 292 and 294 respectively receive voltages from the left and right output terminals of a flip-flop 296. The signals from the "and" networks 292 and 294 pass through an "or" network 298 to the left input terminals of the flip-flop 258 and a flip-flop 299. The signals passing through the "or" network 298 are also introduced directly to the right input terminal of the flip-flop 282 and through an "or" network 301 to the right input terminal of a flip-flop 303.

Just as the signals on the left output terminal of the flip-flop 290 are introduced to input terminals of the "and" networks 292 and 294, the signals on the right output terminal of the flip-flop are introduced to input terminals of "and" networks 302 and 304. Connections are respectively made to other input terminals of the "and" networks 302 and 304 from the left and right output terminals of the flip-flop 296. The signals from the "and" networks 302 and 304 pass through an "or" network 310 to input terminals of "or" networks 305 and 307, output terminals of which are respectively connected to the right input terminals of the flip-flops 299 and 258. The signals passing through the "or" network 310 are also introduced through an "or" network 309 to the left input terminals of the flip-flops 282 and 303.

The signals from the "and" network 294 not only pass to the "or" network 298 but also to an input terminal of an "or" network 306. Similarly, the signals from the "and" network 302 are introduced to another input terminal of the "or" network 306 as well as to the "or" network 310. The signals from the "or" network 306 pass to input terminals of "and" networks 300 and 308, other input terminals of which respectively receive voltages from the left and right output terminals of the flip-flop 296. The output signals from the "and" network 308 are introduced to the left input terminal of the flip-flop 296. The output signals from the "and" network 300 are introduced through an "or" network 313 to the right input terminal of the flip-flop 296.

In addition to being introduced to the "and" networks 300 and 308, the output signals from the "or" network 306 pass to the left input terminal of a flip-flop 312. The signals from the "or" network 306 also pass to the left input terminal of a delay line 314 having its output terminal connected to the right input terminal of the flip-flop 312. The grid of a tube 316 receives the signals on the left output terminal of the flip-flop 312. The grid of the tube 316 is negatively biased through a resistance 318 from an appropriate terminal of a source 320 of direct voltage. The cathode of the tube 316 is grounded and the plate is connected to a resistance 322. The coil 170 (also shown in FIGURE 4) is in series with the resistance 322 and the movable contact of a switch 319. The stationary contact of the switch 319 is connected to a second terminal of the voltage source 320. The second terminal is connected in the voltage source 320 to provide a positive voltage.

The output signals from the delay line 314 also pass to an input terminal of a delay line 324 having its output terminal connected to a delay line 326 and to the left input terminal of a flip-flop 328. The right input terminal of the flip-flop 328 receives the output signals from the delay line 326. A connection is made from the left output terminal of the flip-flop 328 to the grid of a tube 330 negatively biased through a resistance 332 from the voltage source 320. The cathode of the tube 330 is grounded and the plate of the tube is connected to a resistance 334. The resistance 334 and the coil 168 (also shown in FIGURE 4) form a series circuit between the plate of the tube 330 and the movable contact of the switch 319.

Just as the signals on the left output terminal of the flip-flop 328 are introduced to the grid of the tube 330, the signals on the left output terminal of the flip-flop 299 are introduced to the grid of a tube 340 negatively biased through a resistance 341 from the voltage source 320. The cathode of the tube 340 is grounded and the plate of the tube is connected to a resistance 342. The resistance 342 is in series with the coil 102 (also shown in FIGURES 1 and 2) between the plate of the tube 340 and the movable contact of the switch 319.

A resistance 344 and the coil 114 (also shown in FIGURE 1) are also in series between the movable contact of the switch 319 and the plate of a tube 346. The cathode of the tube 346 is grounded and the grid of the tube is negatively biased through a resistance 348 from the voltage source 320. The grid of the tube 346 is also connected to the left output terminal of the flip-flop 303.

In addition to the connections described above, the movable contact of the switch 319 is connected to one terminal of a capacitance 350. The other terminal of the capacitance 350 has common connections with the right input terminals of the flip-flops 260, 262 and 264 and the flip-flops 284, 286 and 288 in FIGURE 7. These connections are not shown for purposes of simplicity. The capacitance 350 also has common connections with input terminals of the "or" networks 305, 307, 309 and 313. Another input terminal of the "or" network 305 is connected through a delay line 352 to the "or" network 298. Similarly, a connection is made from the "or" network 309 to the input terminal of a delay line 354 and from the output terminal of the delay line 354 to an input terminal of the "or" network 301.

Since the drums 16, 18, 20, 22 and 24 are constructed in a similar manner as described above, they also operate in a similar manner. For this reason, the operation of each drum should be understood from a description of the operation of the drum 20. Since the drum 20 is coupled to the shaft 54 (FIGURE 3), it rotates with the shaft when the shaft is driven by the belt 68. The housing 60 remains stationary as the shaft 54 rotates because of the operation of the bearings 56 and the conduit 84 also remains stationary since it is push-fit into the plate 80 defining the bottom of the housing.

Even though the shaft 54 is rotating relative to the conduit 84, the vacuum pump 86 is able to withdraw air through the continuous passage formed by the shaft in the conduit. This results from the operation of the disk 78 and the plate 80 in producing a seal in the junction between the shaft 54 and the conduit 84. The vacuum created by the pump 86 causes air to be withdrawn from the drum 20 through the passageways 46 and the hollow contours of the shaft 54 and the conduit 84. Since the slots 42 communicated with the passageways 46, an inward pressure is created on the periphery of the drum 20 upon the operation of the vacuum pump 86.

As previously described, the drums 16, 18, 20, 22, 24 and 26 are constructed and operate in a manner similar to that described above for the drum 20. In this way, a vacuum force is created on the periphery of each of the drums 16, 18, 20, 22, 24 and 26. This force is instrumental in maintaining the cards 10 in fixed position on the peripheries of the drums as the drums rotate. The cards 10 become positioned on the peripheries of the drums in a manner which will be described in detail subsequently.

Figure 2:
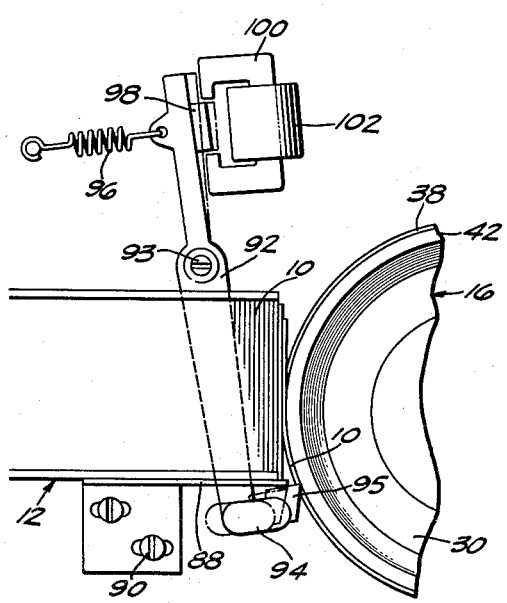
FIGURE 2 is an enlarged fragmentary top plan view somewhat schematically illustrating the construction of a drum forming a part of the embodiment shown in FIGURE 1 and the construction of members associated with the drum for controlling the transfer of cards from one of the input stacks, certain members being shown in one position in broken lines and in a second position in full lines.

In the normal positioning of the bar 92 (FIGURES 1 and 2), the fingers 95 fit within the slots 42 of the drum 16 to prevent cards from moving on the drum past the bar. Since the fingers 95 are positioned relatively close to the stack 12, the fingers actually operate in their normal position to prevent any card from leaving the stack 12, as best seen in FIGURE 2. The fingers 95 are moved out of the slots 42 in the drum 16 when the coil 102 is energized by the logical circuitry shown in FIGURES 7 to 9, inclusive. The fingers 95 are moved out of the slots 42 in the drum 16 by the operation of the magnet 100 on the armature 98 when the coil 102 is energized. This causes the armature 98 to be attracted toward the magnet 100 and the bar 92 to be pivoted in a clockwise direction against the action of the spring 96. A pivotal movement of the bar 92 in a clockwise direction causes the bar to move away from the periphery of the drum 16 so that the cards 10 from the stack 12 can move on the drum 16 past the fingers 95.

When the bar 92 is pivoted in a clockwise direction, the drum 16 presses against the card 10 at the right end of the stack 12 and moves the card with it toward the throat member 88. The drum 16 can be made to remove only one of the cards 10 from the stack 12 at any one time by adjusting the spacing between the throat member 88 and the periphery of the drum 16. Upon the removal of each card 10 from the stack 12, the card 10 becomes positioned on the periphery of the drum 16 at the neck portion 38 (FIGURE 3) of the drum. This helps to hold each card 10 in position on the periphery of the drum 16 as the drum rotates.

After each card 10 has been removed by the drum 16 from the stack 12, it rotates through a particular angular distance before reaching the gate 116 in FIGURE 1. Although the gate 116 is fixedly positioned, it has fingers similar to the fingers 160 in FIGURES 4, 5 and 6. These fingers extend between the periphery of the drum 16 at their forward end and the periphery of the drum 20 at their rear end in a manner similar to that shown in FIGURE 4 for the fingers 160. Because of this disposition, the fingers on the gate 116 obtain a transfer of the cards from the periphery of the drum 16 to the periphery of the drum 20. This will be described in detail subsequently in connection with the operation of the gate 130 in FIGURES 4, 5 and 6.

After the cards 10 have been transferred from the drum 16 to the drum 20, they remain fixedly positioned on the periphery of the drum 20 as the drum rotates in a clockwise direction. The cards remain in fixed position on the drum 20 even after they reach the gate 118 (FIGURE 1). This results from the fact that the fingers on the gate 118 are positioned to obtain a transfer of cards only from the drum 18 to the drum 20. Because of the disposition of the fingers on the gate 118, the cards transferred to the drum 20 from the drum 16 pass under the gate 118 and continue their movement on the drum 20 toward the drum 22.

In like manner, the bar 106 acts in its normal positioning to prevent the transfer of the cards 10 from the stack 14 to the drum 18. When the coil 114 is energized by the logical circuitry shown in FIGURES 7 to 9, inclusive, the magnet 112 actuates the armature 110 to produce a pivotal movement of the bar 106 in a counter-clockwise direction. This causes the fingers at the end of the bar 106 to move out of the slots in the drum 16 corresponding to the slots 42 in the drum 20. By moving the fingers out of the slots, the card 10 at the bottom of the stack 14 becomes released so that it can become transferred to the drum 18 as the drum presses against the card in its rotary movement. Only one card is transferred at any one time from the stack 14 to the drum 18 because of the operation of the throat member 104 and because of the operation of certain stages shown in FIGURE 8 and hereinafter to be described in detail. The card in turn becomes transferred from the drum 18 to the drum 20 by the action of the gate 118 which operates in a manner similar to that described above for the gate 116.

The cards transferred from the stacks 12 and 14 to the drum 20 remain on the drum during the drum rotation until the cards reach the position at which the drums 20 and 22 are contiguous. The cards then move in a path dependent upon the positioning of the gate 130. In the positioning of the gate 130 shown in FIGURE 4, the fingers 160 extend at their front end into the slots 42 in the drum 20. The fingers extend into the slots 42 to a position radially interior to the cards 10 traveling on the periphery of the drum 20. By disposing the fingers radially interior to the periphery of the drum 20 in a manner similar to that shown in FIGURE 4, the fingers block the movement of the cards 10 on the periphery of the drum so that the cards are forced to move along the fingers.

Because of the disposition of the fingers 160 relative to the drums 20 and 22, the cards 10 leave the drum 20 at the forward end of the fingers and travel along the fingers to the periphery of the drum 22. This results from the tapered configuration of the fingers 160 as at 162 and from the disposition of the fingers in contiguous relationship to the drum 22 at a position laterally near the post 152. When the cards reach the drum 22, the vacuum force produced at the periphery of the drum serves to hold the cards in fixed position on the periphery of the drum as the drum rotates. The cards 10 cannot be lost during the process of transfer between a pair of adjacent drums such as the drums 20 and 22, since at least a portion of each card is forced by pressure against the periphery of a drum during the process of transfer. For example, the trailing portion of each card is pressed against the drum 20 at the beginning of the card movement along the fingers 160 of the gate 130. Subsequently, the end portions of each card are disposed on the peripheries of the drums 20 and 22 while the middle portion is moving along the tapered edges of the fingers 160. In the final stages of transfer from the drum 20 to the drum 22, the leading portion of each card 10 is pressed against the periphery of the drum 22 by the vacuum force exerted on the drum.

In a second position of the gate 130, the fingers 160 are disposed at their forward end in contiguous relationship to the periphery of the drum 22. In this position, the fingers 160 extend into the slots 42 of the drum 22 to a position radially interior to the cards 10 traveling on the periphery of the drum. Because of this disposition, the cards traveling on the drum 22 cannot move on the drum past the fingers 160. Since the fingers 160 are tapered at their top end as at 161 in a manner similar to the taper 162 provided for the fingers at their bottom end in FIGURE 4, the fingers obtain a transfer of the cards 10 from the drum 22 to the drum 20 in the second position of the fingers.

At particular times, the gate 130 is pivoted to a neutral position from its positions coupling the drums 20 and 22. The gate is pivoted to its neutral position when no current flows through either of the coils 168 and 170 in FIGURE 4. In the neutral positioning of the gate 130, the fingers 160 are disposed out of contact with the slots 42 in each of the drums 20 and 22. Since the fingers 160 are no longer positioned within the slots 42 of either of the drums 20 or 22, the cards 10 in each drum are able to rotate with the drum past the fingers. This may be seen from the relative disposition of the fingers 160 and the drums 20 and 22 in FIGURE 6.

Upon the movement of a card 10 on the drum 22 past the gate 130, the card continues its circulation on the drum through another revolution. However, a card 10 on the drum 20 is prevented from rotating through another complete revolution by the action of the gate 172 associated with the drum 24. This gate causes the cards moving on the drum 20 past the gate 130 to become transferred to the drum 24. The cards transferred to the drum 24 continue on the drum through approximately one half of a drum revolution and then become transferred to the output stack 174 by the stop 176.

The gate 130 is pivoted in accordance with the operation of the circuitry shown in FIGURES 7, 8 and 9. The circuitry shown in FIGURES 7, 8 and 9 in turn operates in accordance with the information on the cards moving on the drum 20 past the heads such as the heads 122, 124, 126 and 128. This information may be in binary form in which an indication having first characteristics represents a binary value of "0" and an indication having second characteristics represents a binary value of "1." For example, when the information is in magnetic form, a magnetic bit of positive polarity may represent an indication of "1" and a magnetic bit of negative polarity may represent an indication of "0." Indications of "1" and "0" are illustrated schematically in the fragment of the card 10 shown in FIGURE 7.

The bits of binary information on the card 10 are disposed in a plurality of horizontal rows. One of the horizontal rows such as the bottom row of the card 10 in FIGURE 7 may have an indication of "1" in each position. By providing an indication of "1" in each position, a count is obtained as to the number of vertical columns which have been read by the heads such as the heads 124, 126 and 128. In this way, each vertical column on a card 10 is made available for selection from the other vertical columns on the cards.

The transducing member 122 reads the indications of "1" in the successive positions on the bottom horizontal row of the card 10. These indications are amplified and inverted by the amplifier 180 and are introduced as negative signals to the left input terminal of the flip-flop 188. Each signal from the amplifier 180 triggers the flip-flop 188 to produce a relatively high voltage on the left output terminal of the flip-flop. The flip-flop 188 and the other flip-flops included in the application may be constructed in a manner similar to that shown in FIGURE 5–6 and described on page 166 of volume 19 entitled "Wave Forms" of the Radiation Laboratory Series prepared by the Massachusetts Institute of Technology and published by the McGraw-Hill Book Company, Inc. of New York, New York in 1949.

At an intermediate time until the introduction of the next pulse position in the bottom horizontal row of the card 10, the negative signal from the amplifier 180 passes through the delay line 196. This signal then passes to the right input terminal of the flip-flop 188 and triggers the flip-flop to produce a relatively high voltage on the right output terminal of the flip-flop. In this way, the flip-flop 188 is prepared for triggering by the passage of each signal from the amplifier 180 to the left input terminal of the flip-flop. The flip-flop 188 is in effect triggered to its true state by clock signals produced by the amplifier 180 and the delay line 196 in each pulse position on the card 10 in the horizontal direction.

Every time that the voltage on the left output terminal in the flip-flop 188 changes from a high level to a low level, the count in the counter 222 is increased by an integer. This results from the construction of the counter 222 such as from a plurality of flip-flops connected in cascade arrangement. The counter 222 is constructed to count from "1" to a number corresponding to the number of vertical columns in each card. For example, the counter 222 may count from "1" to "60" when there are 60 vertical columns on each card. When the count in the counter 222 reaches this number, circuits in the counter become operative to introduce a triggering signal to all of the flip-flops in the counter. This signal triggers the flip-flops in the counter 222 to a pattern of operation representing a value of "1." This occurs at the time that the last vertical column in each card has moved past the heads such as the heads 122, 124, 126 and 128. In this way, the counter 222 initiates a new count of the number of columns on a card every time that a new card is presented to the heads such as the heads 122, 124, 126 and 128 for processing.

For each number, the flip-flops in the counter 222 are in an individual state of operation which is different from the pattern of flip-flop operation for any other number. For a particular count, the pattern of operation of the flip-flops in the counter 222 corresponds to the pattern of operation of the selector 220. The counter 222 and the other counters included in the invention may be constructed in a manner similar to that shown in FIGURE 7–3 and described on page 195 of "Arithmetic Operations in Digital Computers" by R. K. Richards (published by D. Van Nostrand Co. Inc. of Princeton, New Jersey in 1955).

The operation of the counter 222 and the selector 220 may be seen from the embodiments shown in FIGURE 9. When each of the flip-flops 234, 236, 238 and 240 is triggered to a "true" state of operation, a relatively high voltage is produced on the left output terminal of the flip-flop and a relatively low voltage is produced on the right output terminal of the flip-flop. In its false state of operation, each flip-flop has a relatively high voltage on its right output terminal and a relatively low voltage on its left output terminal.

As will be seen, the movable contacts of the switches 224, 226, 228 and 230 in FIGURE 9 have relatively high voltages only when the flip-flops 234, 236, 238 and 240 have particular states of operation. For example, a relatively high voltage appears on the movable contact of the switch 224 only when the flip-flop 234 is in its "false" state of operation. Similarly, relatively high voltages are produced on the movable contacts the switches 226, 228 and 230 only when the flip-flops 236, 238 and 240 are in their "true" state of operation.

Since the movable contacts of the switches 224, 226, 228 and 230 are connected to the "and" network 242, relatively high voltages can be simultaneously introduced to the "and" network only for a particular count in the flip-flops 234, 236, 238 and 240. This count is determined by the settings of the switches 224, 226, 228 and 230. When relatively high voltages are simultaneously introduced to the "and" network 242 from all the switches such as the switches 224, 226, 228 and 230, the "and" network passes a signal. At all other times, the "and" network 242 operates to prevent the passage of a signal.

For the particular setting of the switches 224, 226, 228 and 230 in FIGURE 9, the "and" network 242 passes a signal only upon the occurrence of a binary count of 1110, where the least significant digit is at the right. This binary count corresponds to a decimal value of "14." The signal from the "and" network 242 in FIGURE 9 would correspond to a signal from the compare network 218 in FIGURE 7.

The heads such as the heads 124, 126 and 128 in FIGURE 7 produce signals in accordance with the magnetic information recorded on the cards 10. For example, the heads 124, 126 and 128 would produce a pattern of "101" in a first position on the card 10 shown in FIGURE 7 in accordance with the magnetic pattern provided on the card. In the next position, the heads 124, 126 and 128 would produce a pattern of "010" and in the third position would produce a pattern of "011," where the least significant digit is at the right.

The signals from the heads such as the heads 124, 126 and 128 are introduced to the amplifiers such as the amplifiers 182, 184 and 186, respectively. The signals are not only amplified by the amplifiers but are also inverted in polarity and are then introduced to the left input terminals of the flip-flops 190, 192 and 194. By inverting the signals, positive signals from the heads are introduced as negative signals to the left input terminals of the flip-flops. These signals trigger the flip-flops into their "true" state of operation as represented by relatively high voltages on the left output terminals of the flip-flops.

The signals of low or negative amplitude from the heads 124, 126 and 128 representing indications of "0" are amplified and inverted by the amplifiers 182, 184 and 186 into signals of high amplitude. The signals are then inverted by the inverters 198, 200 and 202 into signals of low amplitude and are introduced to the right input terminals of the flip-flops 190, 192 and 194, respectively. These signals trigger the flip-flops 190, 192 and 194 into their "false" states of operation as represented by relatively high voltages on the right output terminals of the flip-flops.

As will be seen, signals are produced in the flip-flops such as the flip-flops 190, 192 and 194 in accordance with the pattern of signals induced in the heads such as the heads 124, 126 and 128. The signals on the right and left output terminals of the flip-flops 190, 192 and 194 are introduced to the "and" networks 206, 208, 210, 212, 214 and 216. Since the "and" networks 206, 208, 210, 212, 214 and 216 have second input terminals connected to the output terminal of the compare network 218, the "and" networks are able to become opened only upon the introduction of a signal from the compare network 218. As previously described, the compare network 218 produces a signal only after a particular number of vertical columns on each card 10 has passed by the heads such as the heads 122, 124, 126 and 128.

The output signals from the "and" networks 206, 208, 210, 212, 214 and 216 pass to two similar banks of "and" networks. One of the banks of "and" networks is represented by the stages 246, 248, 250, 252, 254 and 256. The other bank of "and" networks is represented by the stages 270, 272, 274, 276, 278 and 280. Only one bank of "and" networks is presented for opening at any particular time. At that time, the other bank of "and" networks is closed against the passage of signals from the "and" networks 206, 208, 210, 212, 214 and 216.

The particular bank of "and" networks opened at any time is dependent upon the operation of the flip-flops 258 and 282. For example, the bank represented by the "and" networks 246, 248, 250, 252, 254 and 256 is prepared for opening when a relatively high voltage is produced on the left output terminal of the flip-flop 258. At such a time, a relatively low voltage is produced on the left output terminal of the flip-flop 282 to prevent signals from passing through the bank represented by the "and" networks 270, 272, 274, 276, 278 and 280.

In like manner, at particular times a relatively high voltage is produced on the left output terminal of the flip-flop 282. This voltage is introduced to the bank formed by the "and" networks 270, 272, 274, 276 and 280 to open the "and" networks for the passage of signals. At such times, a relatively low voltage is produced on the left output terminal of the flip-flop 258 to prevent signals from passing through the bank represented by the "and" networks 246, 248, 250, 252, 254 and 256.

The signals passing through the "and" networks 246, 248, 250, 252, 254 and 256 are introduced to the right and left input terminals of the flip-flops 260, 262 and 264. These signals trigger the flip-flops 260, 262 and 264 into a pattern of operation corresponding to the pattern of operation of the flip-flops 190, 192 and 194. In this way, the indications in a particular vertical column of the card 10 become transferred to the flip-flops 260, 262 and 264 to represent particular information. As will be described in detail subsequently, this information will control the passage of cards to the output stack 174 in FIGURE 1.

In like manner, the signals passing through the "and" networks 270, 272, 274, 276, 278 and 280 are introduced to the right and left input terminals of the flip-flops 284, 286 and 288. These signals trigger the flip-flops 284, 286 and 288 into a pattern of operation corresponding to the pattern of the flip-flops 190, 192 and 194. In this way, the indications in a particular vertical column of a card 10 become transferred to the flip-flops 284, 286 and 288 so as to be made available for subsequent use in the apparatus constituting this invention.

Since signals can only pass to the flip-flops 260, 262 and 264 or to the flip-flops 284, 286 and 288 at a particular position for each card 10, only one bank of flip-flops can receive this information for each card. The other bank of flip-flops continues in its previous state of operation. For example, the flip-flops 260, 262 and 264 can receive different information from the "and" networks 246, 248, 250, 252, 254 and 256 when a relatively high voltage is produced on the left output terminal of the flip-flop 258. At such times, the operation of the flip-flops 284, 286 and 288 cannot become changed. This results from the fact that a relatively low voltage is produced on the left output terminal of the flip-flop 282 to prevent signals from passing to the "and" networks 270, 272, 274, 276, 278 and 280.

The signals from the flip-flops 260, 262 and 264 and from the flip-flops 284, 286 and 288 are introduced to the comparator 266. The comparator is shown in block form since its construction and operation are well known in the art. The operation of the comparator will also be seen from the subsequent discussion and from the logical equation which will be developed hereinafter.

The comparator 266 compares the voltages introduced to it from the flip-flops 260, 262 and 264 and from the flip-flops 284, 286 and 288. When the information stored in the flip-flops represents numerical information, the comparator 266 determines whether the number stored in the flip-flops 260, 262 and 264 is less than the number stored in the flip-flops 284, 286 and 288. Similarly, the comparator may operate to determine if a letter stored in the flip-flops 260, 262 and 264 precedes a letter represented by the pattern of operation of the flip-flops 284, 286 and 288 when alphabetical information is involved.

The comparator operates to make the determinations described in the previous paragraph by comparing the pattern of operation in corresponding flip-flops in each of the two banks. For example, the operation of the flip-flops 260 and 284 is compared. Similarly, the patterns of operation of the flip-flops 262 and 264 are respectively compared with the patterns of operation of the flip-flops 286 and 288. The results of the comparison between each pair of flip-flops are then used to provide a final comparison using all of the results obtained.

The operation of the comparator 266 may be expressed as $$X = i_3 j_3' + (i_3 j_3 + i_3' j_3')(i_2 j_2' + [i_2 j_2 + i_2' j_2'] i_1 j_1')$$

where $j_1$ = a relatively high voltage on the left output terminal of the flip-flop 260;

$j_1'$ = a relatively high voltage on the right output terminal of the flip-flop 260;

$j_2$ and $j_3$ = relatively high voltages on the left output terminals of the flip-flops 262 and 264, respectively;

$j_2'$ and $j_3'$ = relatively high voltages on the right output terminals of the flip-flops 262 and 264, respectively;

$i_1$, $i_2$ and $i_3$ = relatively high voltages on the left output terminals of the flip-flops 284, 286 and 288, respectively;

$i_1'$, $i_2'$ and $i_3'$ = relatively high voltages on the right output terminals of the flip-flops 284, 286 and 288, respectively;

"+" = an "or" proposition in which a signal is produced when any of the two or more propositions covered by the "or" proposition is true; and $X$ = a signal on the line 287 to indicate that the number stored in the flip-flops 284, 286 and 288 is greater than the number stored in the flip-flops 260, 262 and 264.

This logic is used when the information is recorded in binary form on the card and when the information read by the heads such as the heads 124, 126 and 128 is used to produce a composite value. For example, when indications of "1," "1" and "0" are respectively read by the heads 124, 126 and 128, a decimal value of "3" is obtained.

The operation of the circuitry shown in FIGURE 8 may perhaps best be seen from a discussion of specific examples. When the switch 319 is closed, the operation of the system shown in FIGURE 8 is commenced since a positive potential is now supplied from the voltage source 320 to the various components. The transient surge of voltage from the source 320 passes as a positive signal through the capacitance 350 to the "or" networks 307 and 309. The signal then passes through "or" networks 305, 307 and 309 and triggers the flip-flops 258 and 299 and the flip-flops 282 and 303. The flip-flops 258 and 299 are triggered to their "false" states as represented by relatively high voltages on their right output terminals. At the same time, the transient signal passing through the capacitance 350 triggers the flip-flops 282 and 303 to their "true" states as represented by relatively high voltages on the left output terminals of the flip-flops. The transient signal passing through the capacitance 350 also triggers the flip-flops 260, 262 and 264 (FIGURE 7) and the flip-flops 284, 286 and 288 to their false states for reasons which will be described in detail subsequently. The connections to the flip-flops are not shown for purposes of simplifying the drawings. It should be appreciated, however, that the signal from the capacitance 350 would have to pass through separate "or" networks before reaching the right input terminals of the flip-flops 260, 262 and 264 and the flip-flops 284, 286 and 288.

Since the flip-flop 299 is triggered to its "false" state, a relatively low voltage is produced on the left output terminal of the flip-flop. This voltage prevents the tube 340 in FIGURE 8 from being triggered into a state of conductivity. By preventing the tube 340 from becoming conductive, the coil 102 cannot become energized. Since the coil 102 cannot become energized, the fingers 95 on the bar 92 remain in position within the slots 42 of the drum 16 and prevent any cards in the stack 12 from being removed by the drum for travel on the drum.

Upon the production of a relatively high voltage on the left output terminal of the flip-flop 303, a sufficiently positive voltage is introduced to the grid of the tube 346 to overcome the negative bias introduced to the grid of the tube from the voltage source 320. This causes the tube 346 to become conductive and current to flow through a circuit including the voltage source 320, the switch 319, the coil 114, the resistance 344 and the tube 346. The coil 114 becomes energized and actuates the armature 110 to produce a pivotal movement of the bar 106 in a clockwise direction. This causes the bar 106 to move pivotally away from the periphery of the drum 18. In this way, the fingers on the bar 106 leave the slots in the drum 18 so as not to block the transfer of a card 10 to the drum.

When the fingers on the bar 106 are moved out of their normal position within the slots of the drum 18, the drum presses against the card 10 at the right end of the stack 14 and removes the card from the stack. The card then travels on the drum 18 in accordance with the drum rotation until the gate reaches the gate 118 in FIGURE 1. The card then becomes transferred from the drum 18 to the drum 20 by the action of the gate 118 as described previously and subsequently reaches the heads such as the heads 122, 124, 126 and 128 in FIGURE 7. At a particular vertical column dependent upon the setting of the compare network 218 in FIGURE 7, the signals induced in the heads 124, 126 and 128 pass through the "and" networks 206, 208, 210, 212, 214 and 216. The operation of the "and" networks in passing the signals in only a selected vertical column on each card 10 has been described in detail previously.

The signals from the "and" networks 206, 208, 210, 212, 214 and 216 pass through the bank of "and" networks represented by the networks 270, 272, 274, 276, 278 and 280. This results from the fact that the latter "and" networks have been prepared for opening by a relatively high voltage on the left output terminal of the flip-flop 282. The signals passing through the "and" networks 270, 272, 274, 276, 278 and 280 trigger the flip-flops 284, 286 and 288 to a pattern of operation representing the signals induced in the heads 124, 126 and 128. For purposes of subsequent discussion, the signals produced in the flip-flops 284, 286 and 288 may have a decimal value of "2" as represented by a binary pattern of 010, where the least significant digit is at the right. This would cause the flip-flop 286 to have a "true" state of operation and the flip-flops 284 and 288 to have "false" states of operation.

Since the flip-flops 284, 286 and 288 indicate a decimal value of "2" and the flip-flops 260, 262 and 264 indicate a decimal value of "0," a signal is introduced to the output line 287 from the comparator 266. This signal triggers the flip-flop 290 to its "true" state as represented by a relatively high voltage on the left output terminal of the flip-flop. The high voltage on the left output terminal of the flip-flop 290 is introduced to the "and" networks 292 and 294 so that a signal can pass through one of the networks.

The transient signal produced upon the closure of the switch 319 not only operates upon the flip-flops described above but also passes through the "or" network 313 to the right input terminal of the flip-flop 296. The transient signal triggers the flip-flop 296 to its "false" state as represented by a relatively high voltage on the right output terminal of the flip-flop. This voltage is introduced to the "and" network 294 so that the signal produced on the left output terminal of the flip-flop 290 can pass through the "and" network.

The signal from the "and" network 294 passes through the "or" network 306 to the flip-flop 312. This signal triggers the flip-flop 312 to produce a relatively high voltage on the left output terminal of the flip-flop. The high voltage on the left output terminal of the flip-flop 312 is introduced to the grid of the tube 316 to trigger the tube into a state of conductivity for a flow of current through the coil 170. When the coil 170 (FIGURES 4 and 8) becomes energized, the gate 130 (FIGURES 4, 5 and 6) is pivoted to a position for providing a transfer of a card 10 from the drum 22 to the drum 20. However, this pivotal movement of the gate 130 has no effect at this time since there are no cards as yet on the drum 22.

After a particular delay dependent upon the characteristics of the delay line 314, the flip-flop 312 becomes triggered to its "false" state. This delay is of sufficient duration to allow any card on the periphery of the drum 22 to become completely transferred to the periphery of the drum 20. However, the delay is not long enough for any part of a card 10 on the drum 20 to reach the gate 130. The reason for this will be described subsequently.

The signal passing through the delay line 314 is further delayed by the operation of the line 324. The lines 314 and 324 provide a total delay corresponding to the time required for a card 10 to travel on the drum 20 from the heads 122, 124, 126 and 128 to the gate 130. The signal passing through the delay line 324 triggers the flip-flop 328 to its "true" state as represented by a relatively high voltage on the left output terminal of the flip-flop.

The high voltage produced on the left output terminal of the flip-flop 328 is introduced to the grid of the tube 330 to make the tube conductive. Current then flows through a circuit including the voltage source 320, the coil 168, the resistance 334 and the tube 330. The current energizes the coil 168 (FIGURES 4 and 8)

such that the gate 130 becomes pivoted to a position corresponding to that shown in FIGURE 4 so as to obtain a transfer of a card 10 from the drum 20 to the drum 22. This has been described in detail previously. In this way, the card 10 originally obtained from the stack 14 is transferred from the drum 20 to the drum 22.

The coil 168 remains energized for a time sufficient for the card 10 on the periphery of the drum 20 to become transferred by the gate 130 to the periphery of the drum 22. This corresponds to the delay provided by the line 326. When the signal from the delay line 324 finally passes through the delay line 326, it triggers the flip-flop 328 to produce a relatively high voltage on the right output terminal of the flip-flop. The resultant relatively low voltage on the left output terminal of the flip-flop 328 causes the tube 330 to become cut off and prevents the coil 168 from being further energized. Since the coil 170 is also not energized at this time, the springs 142 and 146 in FIGURE 4 act to pivot the rod 140 to an intermediate position such as is shown in FIGURE 6. This causes the gate 130 to become uncoupled from both of the drums 20 and 22 as described fully above.

In addition to passing to the flip-flop 312, the signal from the "or" network 306 passes to the "and" network 308. Since a relatively high voltage is also introduced to the "and" network 308 from the right output terminal of the flip-flop 296, a signal passes through the network. This signal is introduced to the left input terminal of the flip-flop 296 to trigger the flip-flop for the production of a relatively high voltage on the left output terminal of the flip-flop.

The signal from the "and" network 294 is not only introduced to the "or" network 306 but also to the "or" network 298. The signal from the "or" network 298 passes to the left input terminal of the flip-flops 258 and 299 and triggers the flip-flops to produce relatively high voltages on the left output terminals of the flip-flops.

The relatively high voltage on the left output terminal of the flip-flop 299 is introduced to the grid of the tube 340 to make the tube conductive. Current then flows through a circuit including the voltage source 320, the switch 319, the coil 102, the resistance 342 and the tube 340. This current causes the coil 102 to become energized and to actuate the armature 98 for a pivotal movement of the bar 92 away from the drum 16. When this occurs, the drum 16 presses against the card 10 at the right end of the stack 12 in FIGURE 1 and carries the card past the bar 92 and the throat member 88. The card 10 moves on the drum 20 past the gate 118 since the gate acts only to transfer cards from the drum 18 to the drum 20.

Only a single card 10 can be removed from the stack 12 because of the operation of the throat member 88 (FIGURES 1 and 2) and the delay line 352 (FIGURE 8). The delay line 352 acts to trigger the flip-flop 299 to its "false" state after a sufficient time for the card 10 to travel past the bar 92 in the position where the fingers 95 on the bar are positioned out of the slots 42 in the drum 16. When the flip-flop 299 is triggered to its "false" state, a relatively low voltage is produced on the left output terminal of the flip-flop. This voltage is introduced to the grid of the tube 340 to cut off the tube and thereby prevent the coil 102 from being further energized. The spring 96 in FIGURE 1 then acts to pivot the bar 92 in a clockwise direction for a return of the fingers 95 on the bar to a position within the slots 42 in the drum 16. This prevents other cards 10 from being withdrawn by the drum 16 from the stack 12.

The card 10 which is withdrawn from the stack 12 travels on the periphery of the drum 16 in accordance with the drum rotation and subsequently reaches the heads such as the heads 122, 124, 126 and 128. If the card 10 should have a decimal value of "1" at the selective position controlled by the setting of the comparator 218 in FIGURE 7, a corresponding pattern of indications would be produced in the flip-flops 190, 192 and 194. This would be represented by relatively high voltages on the left output terminal of the flip-flop 190 and on the right output terminals of the flip-flops 192 and 194.

The signals on the output terminals of the flip-flops 190, 192 and 194 at the selective position of the card 10 pass through the "and" networks 246, 248, 250, 252 254 and 256 in FIGURE 7. The signals pass through these "and" networks because of the relatively high voltage on the left output terminal of the flip-flop 258. The signals trigger the flip-flops 260, 262 and 264 in a pattern corresponding to the pattern previously existing in the flip-flops 190, 192 and 194. The signals in the flip-flops 260, 262 and 264 are compared in the comparator 266 with the signals previously generated in the flip-flops 284, 286 and 288 by the first card withdrawn from the stack 14.

Since the signals stored in the flip-flops 260, 262 and 264 have a lower value than the signals stored in the flip-flops 284, 286 and 288, a signal is again produced on the output line 287 in FIGURE 8. This signal maintains the flip-flop 290 in a "true" state such that a relatively high voltage is produced on the left output terminal of the flip-flop. This voltage is introduced to the "and" network 292, which passes a signal because of the relatively high voltage on the left output terminal of the flip-flop 296.

As will be seen in FIGURE 8, the "and" network 292 is not connected to the "or" network 306. This prevents a signal from passing through the "or" network 306 and one of the "and" networks 300 and 308 to the flip-flop 296 to trigger the flip-flop. Because of this, the flip-flop 296 remains in its "true" state as represented by a relatively high voltage on the left output terminal of the flip-flop.

The failure to introduce a signal to the "or" network 306 also prevents a signal from being introduced initially to the flip-flop 312 and subsequently to the flip-flop 328. Since the flip-flops 312 and 328 are not triggered to their "true" states, the gate 130 (FIGURES 4, 5 and 6) cannot be actuated in a manner similar to that described above to couple the drums 20 and 22 for the transfer of a card 10 between these drums. This causes the card 10 previously transferred to the drum 22 to continue its circulatory movement on the preiphery of the drum as the drum rotates.

By maintaining the gate 130 in its neutral state, the card 10 traveling on the periphery of the drum 20 continues past the gate 130 to the drum 24. The card 10 is then transferred by the gate 172 to the drum 24 and is carried by the drum to the output stack 174 for transfer to the output stack by the stop 176. As may be seen from the above discussion, the card 10 transferred to the output stack 174 was originally obtained from the stack 12. The transfer of the card 10 to the output stack is facilitated by the operation of the stop 176.

The signal from the "and" network 292 passes through the "or" network 298 to the left input terminal of the flip-flop 258 for the production of a relatively high voltage on the left output terminal of the flip-flop. The signal also triggers the flip-flop 299 to its "true" state so as to make the tube 340 conductive in a manner similar to that described above. This in turn energizes the coil 102, which actuates the armature 98 and the bar 92 to provide for the removal of a card 10 from the stack 12. The card 10 is removed from the stack 12 by the action of the drum 16 against the card as described fully above.

The card removed from the stack 12 is subsequently transferred to the drum 20 for movement past the reading heads such as the heads 122, 124, 126 and 128. By providing for the transfer to the drum 20 of the next card from the stack 12, the card passing to the output stack 174 becomes replaced by the next card from the same input stack. This results from the fact that the card passing to the output stack 174 was originally obtained from the input stack 12.

When the second card 10 from the stack 12 moves past the heads such as the heads 122, 124, 126 and 128, it produces in the flip-flops 190, 192 and 194 (FIGURE 7) patterns of signals corresponding to the information on the card. At the selective position dependent upon the setting of the compare network 218, the signals from the flip-flops 190, 192 and 194 pass to the flip-flops 260, 262 and 264. This results from the fact that the "and" networks 246, 248, 250, 252, 254 and 256 become prepared for opening by the relatively high voltage on the left output terminal of the flip-flop 258. The information passing to the flip-flops 260, 262 and 264 replaces the information previously stored in the flip-flops.

The information stored in the flip-flops 260, 262 and 264 may now have a pattern of 011 corresponding to a decimal value of "3." Since the information stored in the flip-flops 260, 262 and 264 has a greater numerical value than the decimal value of "2" stored in the flip-flops 284, 286 and 288, the comparator 266 produces a signal for introduction to the output line 289 (FIGURE 8). This signal is introduced to the flip-flop 290 to trigger the flip-flop for the production of a relatively high voltage on the right output terminal of the flip-flop.

The high voltage on the right output terminal of the flip-flop 290 is introduced to the "and" network 302. This causes the "and" network 302 to pass a signal since the "and" network has been previously prepared for activation by the relatively high voltage on the left output terminal of the flip-flop 296. The signal from the "and" network 302 passes through the "or" network 306, the "and" network 300 and the "or" network 313 to the right input terminal of the flip-flop 296. The signal triggers the flip-flop 296 to its "false" state as represented by a relatively high voltage on the right output terminal of the flip-flop.

The signal from the "or" network 306 also passes to the left input terminal of the flip-flop 312. The signal triggers the flip-flop 312 for the production of a relatively high voltage on the left output terminal of the flip-flop. This causes the tube 316 to become conductive and the coil 170 to become energized such that the gate 130 is pivoted into position for coupling the drums 20 and 22. In this position of coupling, the card 10 on the drum 22 becomes transferred to the drum 20 for movement on the latter drum to the gate 172. The gate 172 then transfers the card 10 to the drum 24 so that the card can be transferred to the output stack 174.

After the card 10 has been transferred from the drum 22 to the drum 20 for movement to the output stack 174, the flip-flop 312 becomes triggered to its "false" state. This results from the passage of a signal through the delay line 314 to the right input terminal of the flip-flop 312. When the flip-flop 312 is triggered to its "false" state, a relatively low voltage is introduced to the tube 316 to cut off the tube. This prevents the coil 170 from being further energized so that the gate 130 is no longer pivoted from its position effectuating a transfer of the card 10 from the drum 22 to the drum 20.

At a particular time after the flip-flop 312 has been triggered to its "false" state, a signal passes through the delay line 324 to the left input terminal of the flip-flop 328. This signal triggers the flip-flop 328 to its "true" state as represented by a relatively high voltage on the left output terminal of the flip-flop. The high voltage on the left output terminal of the flip-flop 328 causes the tube 330 to become conductive and the coil 168 to become energized. When the coil 168 becomes energized, the gate 130 becomes pivoted in a manner similar to that previously described to a second position coupling the drums 20 and 22. In this position, the card 10 on the drum 20 becomes transferred to the drum 22 for circulation on the latter drum.

After the card 10 has been transferred from the drum 20 to the drum 22, a signal passes through the delay line 326 to the right input terminal of the flip-flop 328. This signal triggers the flip-flop 328 to its "false" state such that a relatively low voltage is introduced from the left output terminal of the flip-flop 328 to the grid of the tube 330. This causes the tube 330 to become cut off and prevents the coil 168 from being further energized. Because of this, the gate 130 returns to its neutral position under the action of the springs 142 and 146 in FIGURE 4.

The signal from the "and" network 302 is introduced to the "or" network 310 as well as to the "or" network 306. The signal passes through the "or" networks 307 and 305 to the right input terminals of the flip-flops 258 and 299, respectively. This causes the flip-flops 258 and 299 to be triggered to their "false" states as represented by relatively high voltages on the right output terminals of the flip-flops. By triggering the flip-flop 299 to its "false" state, the bar 92 cannot become actuated to a position for obtaining a removal of a card 10 from the stack 12.

The signal from the "or" network 310 also passes through the "or" network 309 to the left input terminals of the flip-flops 282 and 303. This signal triggers the flip-flops 282 and 303 for the production of relatively high voltages on the left output terminals of the flip-flops. The relatively high voltage on the left output terminal of the flip-flop 303 causes the tube 346 to become conductive and the coil 114 to become energized. By energizing the coil 114, the bar 106 becomes actuated so that a card 10 can be removed by the drum 18 from the stack 14. This is the same stack as that from which the card just transferred to the output stack was obtained.

Upon the removal of the card 10 from the stack 14, the flip-flop 303 becomes triggered to its "false" state by the passage of a signal through the delay line 354 and the "or" network 301. This cuts off the tube 346 and prevents the coil 114 from being further energized. As a result, the bar 106 returns to a position in which the fingers on the bar are disposed within the slots in the drum 18 to prevent the removal of any further cards from the stack 14.

The card 10 now circulating on the drum 22 was originally obtained from the stack 12 and the card 10 now moving along the drum 20 was originally obtained from the stack 14. As the latter card moves past the heads such as the heads 122, 124, 126 and 128 in FIGURE 7, it produces at the selective position a plurality of indications representing a particular number. These indications may have a digital pattern of "101" to represent a decimal value of "5." This pattern of signal indications is produced in the flip-flops 284, 286 and 288 because of the opening of the "and" networks 270, 272, 274, 276, 278 and 280 by the relatively high voltage on the left output terminal of the flip-flop 282.

Since the flip-flops 284, 286 and 288 indicate a decimal value of "5" and the flip-flops 260, 262 and 264 indicate a decimal value of "3," the comparator 266 produces a signal on output line 287 in FIGURE 8. This signal triggers the flip-flop 290 to its "true" state. Since the "and" network 294 now receives high voltages simultaneously from the left output terminal of the flip-flop 290 and the right output terminal of the flip-flop 296, a signal passes through the "and" network. The signal then passes through the "or" network 306 and the "and" network 308 and triggers the flip-flop 296 for the production of a relatively high voltage on the left output terminal of the flip-flop.

The signal passing through the "and" network 294 and the "or" network 306 triggers the flip-flop 312 to its "true" state. By triggering the flip-flop 312 to its "true" state, the gate 130 becomes actuated into a position for transferring the card on the drum 22 to the drum 20, The card subsequently becomes transferred by the gate 172 to the drum 24 and then becomes deposited in the output stack 174.

After the card 10 has been transferred from the drum 22 to the drum 20, the flip-flop 328 becomes triggered to its "true" state. This causes the gate 130 to be pivoted into a position for obtaining a transfer of a card 10 from the drum 20 to the drum 22. In this way, the card traveling on the drum 20 becomes transferred to the drum 22 for circulation on the drum. The circulation of the card 10 on the drum 22 is obtained because of the return of the gate 130 to its neutral position after the card 10 has been transferred to the drum.

In addition to passing through the "or" network 306, the signal from the "and" network 294 also passes through the "or" network 298. This signal triggers the flip-flops 258 and 299 to their "true" states. By triggering the flip-flop 299 to its "true" state, the bar 92 becomes actuated in a manner similar to that described above. This causes the next card 10 from the stack 12 to be withdrawn by the drum 16 and to be subsequently transferred to the drum 20. In this way, the drum 20 receives a card from the same stack as that from which the card 10 passing to the output stack was obtained.

In like manner, it can be shown that subsequent cards 10 are transferred to the output stack 174 in a logical pattern corresponding to the information at a selective position on each card. The cards are transferred to the output stack 174 in a sequence such that the cards are arranged in the order of increasing numerical significance at the selective position. For example, the cards might be arranged in an order corresponding to values of "1," "2," "3," "5," "7," "8," "10," etc., at the selective position. Instead of arranging the cards in the order of numerical significance, the cards might be arranged in some other logical pattern, as described fully above. This might relate to an alphabetical pattern or some other logical pattern.

The above discussion has not dealt with the possibility of two cards having the same number. For example, the card circulating on the drum 22 might have a decimal value of "7" at the selective position. This might correspond to the value of "7" held at the selective position by the card moving on the drum 20 past the heads such as the heads 122, 124, 126 and 128. In such a situation, it would not matter which of the cards would be selected for transfer to the output stack 174 provided that the other card would be retained for comparison with the next card withdrawn from one of the input stacks.

Actually, the situation of two cards with the same numerical value can be resolved quite easily by the logic set into the comparator 266 (FIGURES 7 and 8). As shown by the logical equation set forth above to control the operation of the comparator 266, the comparator 266 produces an output signal on the line 287 when the numerical value stored in the flip-flops 284, 286 and 288 is greater than the numerical value stored in the flip-flops 260, 262 and 264. When this does not occur, the comparator 266 produces an output signal on the line 289. For this reason, a signal is produced on the line 289 for the situation where the two cards being compared both have the same value at the selective position. A signal is also produced on the output line 289 when the numerical value of the information stored in the flip-flops 284, 286 and 288 is less than that stored in the flip-flops 260, 262 and 264 as described above.

There is thus provided apparatus for merging into a single stack pluralities of cards in two or more stacks. The apparatus merges the cards on a logical basis in accordance with digital information at selected positions in the cards. The apparatus requires only a relatively few drums and relatively simple apparatus in association with the drums to perform the merging operation.

It should be appreciated that the term "transport means" is intended to include drums as well as other types of conveyors for the cards. It should also be appreciated that the term "cards" is intended to include any type of discrete elements capable of storing a plurality of bits of information.

The transducing members 122, 124, 126 and 128 and the circuitry associated with the transducing members and shown in FIGURE 7 may be considered as means for "sensing" particular bits of indications such as recited in the claims. The comparator 266 and the circuitry shown in FIGURE 8 may be considered as one type of means for "processing" the particular bits of information sensed on the cards. It will be appreciated that the term "processing" as used in at least some of the claims is intended to cover other types of operation in addition to the comparison of information on different cards.

As used in the claims, the term "retaining means" is intended to cover the structure shown in FIGURE 2 for providing a controlled transfer of cards from the input stacks to the transport means such as the drums. The term "gating means" as used in the claims is intended to cover the structure shown in FIGURES 4, 5 and 6 for providing a controlled transfer of cards between the different pairs of transport means such as drums. The term "transfer means" is used in the claims to indicate the structure such as the stop 176 for providing a transfer of cards from the transport means such as the drum 24 to the output stacks such as the stack 174.

It will be appreciated that the terms "retaining means," "transfer means" and "gating means" are intended to cover structures providing functions equivalent to the structures shown in the drawings and described in the specification. For example, the "gating means" are recited in the claims as providing first, second and third "relationships" for controlling the transfer of cards between the pair of transport means.

The term "logical circuitry" is used in the claims to indicate the circuitry shown in FIGURES 7 and 8 and described in detail in the specification. Such circuitry may be considered as "logical circuitry" since the circuitry is formed from a plurality of "and" "or" networks and flip-flops which operate in a logical pattern to provide controlled functions in accordance with information processed on the cards.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for use with a plurality of information cards disposed in at least a pair of input stacks and having a plurality of indications on each card, means including a plurality of rotatable drums constructed to hold the cards in fixed position on the drums, the drums in the plurality being disposed relative to one another to facilitate a transfer of cards between different drums in the plurality, means operatively coupled to the drums in the plurality for providing a rotation of the drums, means for sensing particular indications on the cards circulating with the drums, an output stack, means responsive to the particular indications sensed on the cards moving with the drums for processing such information, means disposed relative to the drums in the plurality and relative to the output stack for controlling the transfer of cards between different drums in the plurality and for obtaining a transfer to the output stack of a particular one of the cards circulating with the drums in accordance with the processed information, and means operatively coupled to the processing means for causing the card passing to the output stack to be replaced with a card from one of the input stacks dependent upon the particular card passing to the output stack and in accordance with the processed information.

2. In combination for use with a plurality of information cards disposed in at least a pair of input stacks and having a plurality of indications on each card, means including a rotatable drum constructed to hold cards in fixed position on the drum during the drum rotation and disposed relative to the input stacks to obtain a transfer of cards from the input stacks to the drum, means operatively coupled to the drum for obtaining a rotation of the drum, control means operative upon the cards in the input stacks for providing a controlled transfer of cards from the stacks to the drum at particular times, means responsive to cards transferred to the drum from the input stacks for sensing particular indications on the cards introduced to the drum, comparison means responsive to the particular information sensed on pairs of cards transferred to the drum for comparing such particular information, an output stack, gating means operatively controlled by the comparison means for obtaining the transfer to the output stack of a particular one of the cards in each pair transferred to the drum and for obtaining the transfer in accordance with the operation of the comparison means, and means operatively coupled to the comparison means for operating upon the control means to obtain an introduction to the drum of a card from a particular one of the input stacks upon the transfer of a card to the output stack and in accordance with the particular card transferred to the output stack.

3. In combination for use with a plurality of information cards disposed in at least a pair of input stacks and having a plurality of indications on each card, means including a plurality of rotatable drums constructed to hold the cards in fixed position on the drums and disposed to provide a circulation of cards with the drums and to facilitate a transfer of cards between different pairs of drums in the plurality, means operatively coupled to the drums in the plurality for producing a rotation of the drums, control means operative upon the cards in the input stacks for providing a controlled transfer of the cards from the input stacks to the drums at particular times for movement of the cards with the drums, means operatively coupled to the cards transferred to the drums for sensing the indications at particular positions on each card transferred from the input stacks to the drums, means operatively coupled to the sensing means for processing the indications sensed on the cards disposed on the drums, an output stack, means operatively coupled to the processing means and including transfer members for controlling the transfer of cards between the drums and for obtaining a transfer to the output stack of a particular card circulating with the drums and for obtaining such a transfer in accordance with the processing of the indications sensed on the cards, and means operatively coupled to the processing means for operating upon the control means associated with a particular input stack to replace the transferred card with a new card for circulation with the drums and to obtain such replacement in accordance with the processing of the information on the cards on the drums.

4. In combination for use with a plurality of information cards disposed in at least a pair of input stacks and having a plurality of indications on each card to control the passage of the cards to an output stack, means including a rotatable drum for receiving a pair of cards released from the input stacks and for holding the cards in fixed position on the drum during the drum rotation, means operative upon the cards transferred to the drum for sensing the indications at particular positions on the pair of cards released to the drum, comparison means coupled to the sensing means for comparing the sensed indications on the released cards to provide first control signals for an inequality of one polarity in the comparison of the indications on the cards and to provide second control signals for an inequality of an opposite polarity in the comparison of the indications on the cards, means including transfer means and coupled to the comparing means and operative by the first control signals to obtain a passage of a particular one of the cards in the pair from the drum to the output stack and operative by the second control signals to obtain a passage of the second card in the pair from the drum to the output stack, means coupled to the comparing means and operative by the first and second control signals to obtain a release of a card from one of the input stacks corresponding to the stack from which the particular card passing to the output stack was originally obtained, and means operatively coupled to the rotatable drum for providing a rotation of the drum.

5. In combination for use with a plurality of information cards disposed in at least a pair of input stacks and having a plurality of indications on each card to control the passage of the cards to an output stack, first means including a rotatable drum for obtaining a transfer of cards to the drum from the input stacks and for holding the cards in fixed position on the drum during the drum rotations, means responsive to the cards transferred to the drum for sensing the indications at particular positions on the cards transferred to the drum, comparison means coupled to the sensing means for comparing the sensed indications on the released cards to provide first control signals for one result from the comparison and to provide second control signals for a second result from the comparison, second means including transfer means and coupled to the comparison means and operative by the first control signals to obtain the passage to the output stack of a first one of the cards transferred to the drum from the input stacks and operative by the second control signals to obtain the passage to the output stack of the other one of the cards transferred to the drum from the input stacks, means responsive to the first and second control signals to obtain a controlled operation of the first means for a transfer of the next card from a particular one of the input stacks in replacement for the card transferred to the output stack, and means operatively coupled to the drum or producing a rotation of the drum.

6. In combination for use with a plurality of cards each having a plurality of bits of information on each card, first and second rotatable drums disposed relative to each other to facilitate a transfer of cards between the first and second drums, means operatively coupled to the first and second drums for maintaining the cards in fixed position on the periphery of the first and second drums during the drum rotations, means operatively coupled to the first and second drums for producing a rotation of the drums, a gate disposed between the drums and operative in a first relationship to provide for a movement of the cards with the first drum past the gate and operative in a second relationship to provide a transfer of the cards from the first drum to the second drum and operative in a third relationship to provide a transfer of the cards from the second drum to the first drum, means responsive to the bits of information on the cards on the first drum for sensing particular bits of information on such cards, means responsive to the particular bits of information sensed on the cards on the first drum for processing such information, and means operatively coupled to the processing means for operating on the gate at particular times to obtain an operation of the gate in the first and second and third relationships in accordance with the information on the cards and upon the movement of the cards to the position for transfer by the gate from one of the drums to the other.

7. In combination for use with a plurality of cards each having a plurality of bits of information, a pair of rotatable drums constructed to hold the cards on the drums by a vacuum pressure on the peripheries of the drums for rotation of the cards with the drums and disposed relative to each other to facilitate a transfer of cards between the drums, means operatively coupled to the drums in the pair for producing a rotation of the drums, means operatively coupled to the drums in the pair for creating vacuums in the drums to impose vacuum pressures at the peripheries of the drums, a gate operative in a first relationship to provide a coupled relationship between the drums for a transfer of the card from a first drum in the pair to the second drum in the pair and operative in a second relationship to provide a coupled relationship between the drums for a transfer of the cards from the second drum to the first drum and operative in a third relationship to uncouple the drums for the prevention of the card transfer between the drums, means operatively coupled to the cards on the first drum in the pair at a position before the transfer of the cards by the first drum to the second drum in the pair for sensing particular bits of information on such cards, means responsive to the particular bits of information sensed on the cards on the first drum for processing such information, and means operatively coupled to the processing means for obtaining an operation of the gate at particular times in the first, second and third relationship in accordance with the processed information and upon a movement of the cards with the drums in the pair to the position of transfer of the cards by the gate.

8. In combination for use with a plurality of cards each having a plurality of bits of information, a pair of rotatable drums disposed in a relationship capable of providing a transfer of cards from one drum to the other, means operatively coupled to the drums in the pair for imposing a pressure on the drums for holding the cards in fixed position on the drums during the drum rotation, means operatively coupled to the drums in the pair for providing a rotation of the drums, a gate extending between the drums for providing in a first pivotable position a coupling between the drums to obtain a transfer of the cards from the first drum to the second drum and for providing in a second pivotable position a coupling between the drums to obtain a transfer of the cards from the second drum to the first drum and for disengaging in a third pivotable position the coupling between the drums to provide a continued movement of the cards with the drums past the position of transfer, means including electrical circuitry operatively coupled to the cards on a first one of the drums in the pair for sensing particular bits of information on such cards, means including electrical circuitry responsive to the particular bits of information sensed on each card for processing such information, and means including electrical circuitry operatively coupled to the processing means for providing a control over the times in which the gate is pivoted into its first, second and third positions in accordance with the processed information and upon a movement of the cards to the position for transfer by the gate between the drums.

9. In combination for use with a plurality of information cards disposed in at least a pair of input stacks and having a plurality of indications on each card, means including a plurality of rotatable drums for holding the cards in fixed position on the drums during the drum rotations, means operatively coupled to the drums for producing a rotation of the drums, means including at least a first drum in the plurality for removing the cards individually from the first stack, means including at least a second drum in the plurality for removing the cards individually from the second stack, first gating means disposed relative to the first and second drums in the plurality for obtaining a controlled transfer of cards from the first and second drums to a third drum in the plurality, means operatively coupled to the cards on the third drum in the plurality for sensing the indications at particular positions on the cards respectively transferred to the third drum from the first and second input stacks, means including a fourth drum in the plurality for receiving particular cards from the third drum, second gating means disposed relative to the third and fourth drums and pivotable in one position to provide a transfer of cards from the third drum to the fourth drum and pivotable in a second position to provide a transfer of cards from the fourth drum to the third drum and pivotable in a third position to uncouple the drums, means including transfer means and an output stack for obtaining a transfer to the output stack of the cards moving with the third drum past the position of transfer to the fourth drum in the third position of the gating means and for obtaining a transfer to the output stack of the cards transferred from the fourth drum to the third drum in the second pivotal position of the gating means, means including electrical circuitry operatively coupled to the sensing means for processing the indications sensed on the cards, means including electrical circuitry operatively coupled to the processing means for controlling the positioning of the second gating means in the first, second and third positions in accordance with the processed information and upon the movement of the cards to the position of transfer by the second gating means between the third and fourth drums to obtain a selective transfer to the output stack of the cards transferred to the third drum from the first and second input stacks, and means including electrical circuitry operatively coupled to the processing means for controlling the operation of the first gating means in providing a transfer of cards from the first and second input stacks to the third drum.

10. In combination for use with a plurality of information cards disposed in at least a pair of input stacks and having a plurality of indications on each card, means including a plurality of rotatable drums for holding the cards in fixed position on the drums during the drum rotations, means operatively coupled to the drums in the plurality for providing a rotation of the drums, a first drum in the plurality disposed to receive the cards transferred from the first and second stacks, means including first retaining means and including a second drum in the plurality for obtaining a controlled transfer of cards from the first stack to the first drum, means including second retaining means and including a third drum in the plurality for obtaining a controlled transfer of cards from the second stack to the first drum, means responsive to the cards on the first drum for sensing the indications at particular positions on the cards transferred to the first drum from the second and third drums, means including transfer means and including an output stack associated with the first drum for obtaining a deposit in the output stack of cards transferred to the first drum, a fourth drum in the plurality disposed to receive cards transferred to the first drum from the first and second input stacks, gating means disposed between the first and fourth drums for controlling the passage of cards to the output stack from the first and fourth drums, comparison means including electrical circuitry coupled to the sensing means for comparing the particular indications sensed on the cards transferred to the first drum and for operating on the gating means to obtain a transfer of the cards to the output stack from the first and fourth drums in accordance with such comparison, and means including electrical circuitry coupled to the first and second retaining means for obtaining a transfer of a next card to the first drum from a particular one of the input stacks in accordance with the comparison provided by the comparison means of the particular indications sensed on the cards transferred to the first drum.

11. In combination for use with a plurality of information cards disposed in at least a pair of input stacks and having a plurality of indications on each card, means including a plurality of rotatable drums for holding the cards in fixed position on the drums during the drum rotations, means operatively coupled to the drums for providing a rotation of the drums, a first drum in the plurality disposed to receive the cards transferred from the first and second stacks, means including first retaining means and including a second drum in the plurality for obtaining a controlled transfer of cards from the first stack to the first drum, means including second retaining means and including a third drum in the plurality for obtaining a controlled transfer of cards from the second stack to the first drum, means operatively coupled to the cards on the first drum for sensing the indications at particular positions on the cards transferred to the first drum from the second and third drums, means including transfer means and including an output stack associated with the first drum for obtaining a deposit in the output stack of the cards transferred to the drum, a fourth drum in the plurality disposed to receive cards transferred to the first drum from the first and second input stacks, gating means disposed between the first and fourth drums and pivotable into a first position to provide for a transfer of a card from the first drum to the fourth drum and pivotable into a second position to provide for a transfer of a card from the fourth drum to the first drum for movement to the output stack and pivotable into a third position to uncouple the first and fourth drums for movement of a card with the first drum to the output stack, comparing means including electrical circuitry coupled to the sensing means for comparing the particular indications sensed on the cards transferred to the first drum, means responsive to the operation of the comparing means for producing a pivotal movement of the gating means into the first, second and third positions in accordance with the comparison of the particular indications sensed on the cards and upon the movement of the cards to the position of transfer to obtain a transfer of a card to the output stack, and means including electrical circuitry responsive to the operation of the comparing means for providing a controlled operation of the first and second retaining means to obtain the transfer of a card from a particular one of the input stacks to the first drum upon each transfer of a card to the output stack and in accordance with the comparison provided by the comparing means of the particular indications sensed on the cards.

12. In combination for use with a plurality of information cards disposed in at least a pair of input stacks and having a plurality of indications on each card, first means including a first rotatable drum constructed to hold cards in fixed position on the drum during the drum rotation, means including retaining means operative upon the cards in the input stacks for obtaining a controlled transfer of cards from the first and second input stacks to the first drum, means including a second rotatable drum disposed relative to the first drum to obtain a transfer to the second drum of particular cards transferred to the first drum from the input stacks and constructed to hold the cards in fixed position on the second drum during the drum rotation, means including transfer means and including an output stack disposed to obtain a transfer to the output stack of the cards moving with the first drum past the position at which a transfer of cards is obtained between the first and second drums, means operatively coupled to the first and second drums for producing a rotation of the drums, a gate disposed between the first and second drums at the position of card transfer and operative in a first relationship to couple the drums for a transfer of a card from the first drum to the second drum and operative in a second relationship to couple the drums for a transfer of a card from the second drum to the first drum and for a movement of the card with the first drum to the output stack and operative in a third relationship to uncouple the drums for a movement of a card with the first drum to the output stack, means responsive to the cards on the first drum for sensing the indications at particular positions on the cards transferred to the first drum from the input stacks, means coupled to the sensing means for processing the particular information sensed on the cards, and means coupled to the processing means for obtaining a controlled operation of the retaining means to obtain the transfer of cards in a particular sequence to the first drum from the input stacks and for obtaining a controlled operation of the gate in the first, second and third relationships in accordance with the processed information and upon the movement of the cards to the position of transfer by the gate between the first and second drums.

13. In combination for use with a plurality of information cards disposed in at least a pair of input stacks and having a plurality of indications on each card, means including a first rotatable drum constructed to hold cards in fixed position on the drum during the drum rotation, means including retaining means operatively coupled to the cards in the input stacks to obtain a controlled transfer of cards from the input stacks to the first drum, means including a second rotatable drum disposed relative to the first drum to receive particular cards transferred to the first drum from the input stacks and constructed to hold the cards in fixed position on the second drum during the drum rotation, means including transfer means and including an output stack disposed to obtain a transfer to the output stack of the cards moving with the first drum past the position of transfer of the cards between the first and second drums, a gate disposed between the first and second drums at the position of transfer of cards between the drums and operative in a first relationship to couple the drums for a transfer of a card from the first drum to the second drum and operative in a second relationship to couple the drums for a transfer of a card from the second drum to the first drum and for a subsequent movement of the card with the first drum to the output stack and operative in a third relationship to uncouple the drums for a movement of a card with the first drum to the output stack, means operatively coupled to the cards on the first drum for sensing the indications at particular positions on the cards transferred to the first drum, comparison means responsive to the particular indications sensed on the cards for comparing this sensed information to control the operation of the gate in the different relationships of the gate, means operatively coupled to the comparison means for providing a controlled operation of the retaining means to obtain a transfer to the first drum of a next card in a particular one of the input stacks upon an operation of the gate in the second and third relationships and dependent upon the operation of the gate in the second and third relationships, and means operatively coupled to the comparison means for providing an operation of the gate in the first relationship upon an operation of the gate in the second relationship to obtain a transfer of a first particular card from the first drum to the second drum upon a transfer of a second particular card from the second drum to the first drum for a movement of the second particular card to the output stack.

14. In combination for use with a plurality of cards having a plurality of bits of information, a pair of rotatable drums each having passageways for the withdrawal of fluid such as air, means for producing vacuum effects, means for providing a conduit between the vacuum means and the passageways in each drum for withdrawing fluid from the passageways, each of the drums being slotted along its periphery to provide a communication with the passageways for the creation of an inward pressure for retaining the cards in fixed position on the drum peripheries, means operatively coupled to the drums in the pair for providing a rotation of the drums, means for obtaining an individual transfer of the cards to a first one of the drums in the pair for rotation with the drum, means including a gate pivotably disposed between the drums and having at least one finger shaped to extend in one pivotal position into the slotted periphery of the first drum in the pair for a transfer of a card from the first drum to the second drum in the pair and shaped to extend in a second pivotal position into the slotted periphery of the second drum for a transfer of a card from the second drum to the first drum and shaped to uncouple the first and second drums in a third pivotal position, means responsive to the cards on a particular one of the drums for sensing particular bits of information on such cards, means responsive to the particular bits of information sensed on the cards for processing such information, and means including logical circuitry operatively coupled to the processing means for operating upon the gate means to control the pivotal movements of the gate into the different positions in accordance with the processing of the particular bits of information sensed on the cards.

15. In combination for use with a plurality of cards each having a plurality of bits of information, an input stack for holding the cards, means including a rotatable drum disposed relative to the input stack to remove cards from the input stack and constructed to hold the cards in fixed position on the drum during the drum rotation, means operatively coupled to the drum for producing a rotation of the drum, means including at least one finger disposed in a first position in cooperative relationship with the drum and constructed to prevent the movement of cards with the drum past the finger in such cooperative relationship and disposed in a second position out of cooperative relationship with the drum to obtain the transfer of cards from the input stack to the drum, means responsive to the bits of information on the cards moving with the drum for sensing particular bits of information on such cards, means responsive to the particular bits of information sensed on the cards for processing such information and for obtaining a movement of the finger out of cooperative relationship with the drum in accordance with such processed information for an individual removal of each card in the plurality by the drum from the input stack, and means coupled to the finger for obtaining a movement of the finger into cooperative relationship with the drum upon the individual removal of each card from the stack.

16. In combination for use with a plurality of cards each having a plurality of bits of information, an input stack for holding the cards, means including a rotatable drum disposed in contiguous relationship to the input stack to remove the cards from the input stack and provided with a slot around the periphery of the drum for the creation of a vacuum on the periphery of the drum to hold the cards in fixed position on the drum for movement with the drum, means operatively coupled to the drum for providing a rotation of the drum, means operatively coupled to the drum for producing a vacuum through the slot in the drum, means including a pivotable gate having at least one finger biased for extension into the slot to inhibit the removal of cards from the input stack by the drum, transducing means disposed relative to the cards on the drum for sensing particular bits of information on such cards, and means including electrical circuitry responsive to the particular bits of information sensed on the cards for processing such information and for operating on the gate in accordance with such processed information to pivot the gate for a movement of the finger out of the slot in the drum to obtain an individual withdrawal by the drum of the first card in the stack.

17. In combination for use with a plurality of cards disposed in at least a pair of input stacks and having a plurality of indications on each card to control the passage of the cards to an output stack, movable transport means for tthe cards such that the transport means are constructed and disposed to obtain a movement of the cards with the transport means in different paths, means operatively coupled to the transport means for obtaining a movement of the transport means, retaining means disposed relative to the cards in the input stacks for obtaining a controlled transfer of cards from the input stacks to the transport means for movement of the cards with the transport means, means responsive to the cards transferred from the input stacks to the transport means for sensing particular indications in the plurality on such cards, means responsive to the particular indications sensed on the cards for processing such indications, output means including an output stack disposed relative to the cards on the transport means for providing a controlled transfer of cards from the transport means to the output stack, gating means operatively coupled to the cards on the transport means for obtaining a controlled movement of the cards by the transport means in the different paths in accordance with the operation of the gating means, means including electrical circuitry operatively coupled to the processing means and operative upon the gating means in accordance with the particular indications processed by the processing means to obtain a transport of the cards in the different paths and a transfer of the cards to the output stack in an order dependent upon the different paths of movement of the cards, and means including electrical circuitry operatively coupled to the processing means for operating upon the retaining means in accordance with the particular indications processed on the cards to obtain a transfer to the transport means of a card from a particular one of the input stacks dependent upon the processed indications.

18. In combination for use with a plurality of information cards disposed in at least a pair of input stacks and having a plurality of indications on each card, transport means constructed to hold the cards in fixed position for circulation with the transport means, means operatively coupled to the transport means for obtaining a movement of the transport means, control means disposed relative to the cards in the input stacks and relative to the transport means for providing a controlled transfer of cards from the input stacks to the transport means, an output stack, transfer means disposed relative to the output stack and the cards on the transport means for obtaining a transfer of cards from the transport means to the output stack, means responsive to the cards on the transport means for sensing particular indications in the plurality on such cards, comparison means operatively coupled to the sensing means for comparing the particular indications sensed on each pair of cards moving with the transport means to produce a first signal for an inequality of a first polarity between the particular indications sensed on the cards in the pair and to produce a second signal for an inequality of a second polarity opposite to the first polarity between the particular indications sensed on the cards in the pair, means operatively coupled to the comparison means for operating upon the transfer means to obtain a transfer of a particular one of the cards in each pair to the output stack in accordance with the production of the first and second signals by the comparison means and for obtaining a circulation of the other card in the pair with the transport means, and means operatively coupled to the comparison means for operating upon the control means to obtain a transfer of a successive card to the transport means from a particular one of the input stacks in accordance with the production of the first and second signals by the comparison means for a comparison of the particular indications on the new card and the card circulating with the transport means.

19. In combination for use with a plurality of information cards disposed in at least a pair of input stacks and having a plurality of indications on each card, transport means movable in closed loops and constructed to hold the cards in fixed position for movement with the transport means, means operatively coupled to the transport means for obtaining a movement of the transport means in the closed loops, retaining means disposed relative to the cards in the input stacks and the transport means for obtaining a controlled transfer of cards from the input stacks to the transport means, means operative upon the cards transferred from the input stacks to the transport means for sensing particular indications in the plurality on such cards, comparison means operatively coupled to the sensing means for comparing the particular indications sensed on pairs of cards transferred to the transport means from the input stacks, transfer means including an output stack disposed relative to the cards on the transport means for obtaining a transfer to the output stack of cards moving with the transport means, means including electrical circuitry operatively coupled to the comparison means and including gating means operative by the electrical circuitry for providing for a movement of a particular one of the cards in each pair with the transport means to the transfer means in accordance with the comparison of the particular indications sensed on the cards in the pair and for providing a retention of the other card in the pair on the transport means for continued movement of the other card in closed loops with the transport means, and means including electrical circuitry operatively coupled to the comparison means and operative upon the retaining means upon each transfer of a card to the output stack to obtain a transfer of a successive card to the transport means from a particular one of the input stacks in accordance with the comparison of the particular indications sensed on the transported cards and to provide a replacement for the card transferred to the output stack for purposes of comparing the particular indications sensed on the cards.

20. In combination for use with a plurality of information cards disposed in at least a pair of input stacks and having a plurality of indications on each card, transport means movable in closed loops and constructed to obtain a movement of the cards with the transport means, control means disposed relative to the cards in the input stacks to obtain a controlled transfer of cards from the input stacks to the transport means, means responsive to the cards transferred from the input stacks to the transport means for sensing the indications at particular positions on such cards, means operatively coupled to the transport means for obtaining a movement of the transport means in the closed loops, comparison means including electrical circuitry operatively coupled to the sensing means for comparing the particular indications sensed on the cards on the transport means, an output stack disposed relative to the transport means to receive cards transferred to the transport means from the first and second input stacks, transfer means disposed relative to the cards on the transport means and disposed relative to the output stack for obtaining a transfer of cards from the transport means to the output stack, means including electrical circuitry operatively coupled to the comparison means for obtaining a controlled movement of first particular cards with the transport means to the transfer means in each comparison in accordance with the comparison of the particular indications sensed on the cards for a deposit of such cards in the output stack in a logical sequence and for obtaining a retention of other cards on the transport means for movement in the closed loops, and means including electrical circuitry operatively coupled to the comparison means for operating upon the control means to obtain a transfer of successive cards from particular ones of the input stacks to the transport means upon each transfer of a card to the output stack and in accordance with the comparison of the particular indications sensed on the cards moving in closed loops with the transport means and to obtain a comparison of signal indications at particular positions on such successive cards with the signal indications at the particular positions on the cards retained on the transport means from the previous comparisons.

21. In combination for use with a plurality of cards disposed in at least a pair of input stacks and having a plurality of indications on each card to control the passage of cards to an output stack, transport means movable in closed loops and constructed to retain cards in fixed positioning on the transport means during the movement of the transport means in the closed loops, means operatively coupled to the transport means for obtaining movements of the transport means in the closed loops, retaining means disposed relative to the input stacks and operative in a first relationship to prevent the transfer of cards from the input stacks to the transport means and operative in a second relationship to provide a transfer of cards to the transport means from the input stacks, means operative upon the cards transferred to the transport means for sensing particular indications in the plurality on such cards, transfer means disposed relative to the output stack and the cards on the transport means for obtaining a transfer of cards from the transport means to the output stack, comparison means including electrical circuitry operatively coupled to the sensing means for providing a comparison between the particular indications sensed on the cards transferred to the transport means, gating means disposed relative to the cards on the transport means and operatively coupled to the comparison means for providing a controlled movement of cards to the transfer means associated with the output stack in accordance with such comparison and for providing a retention of other cards on the transport means in each comparison for movement in the closed loops, means including electrical circuitry operatively coupled to the comparison means for operating upon the gating means in each comparison to provide a movement of first particular cards to the transfer means in accordance with the results of the comparison and to provide a retention of second particular cards on the transport means for movement in the closed loops in accordance with the results of the comparison, and means including electrical circuitry operatively coupled to the comparison means for operating upon the retaining means to render the retaining means operative in the second relationship in accordance with the comparison of the particular indications sensed on the cards to provide a transfer of successive cards to the transport means from particular ones of the input stacks for a replacement of the cards transferred to the output stack and to obtain a comparison of the particular indications on the successive cards with the particular indications on the cards retained on the transport means from the previous comparison.

22. In combination for use with a plurality of information cards disposed in at least a pair of input stacks and having a plurality of indications on each card, first and second movable transport means constructed to hold the cards in fixed position on the transport means during the movement of the transport means and disposed relative to each other to facilitate a transfer of cards between the first and second transport means, means operatively coupled to the first and second transport means for obtaining a movement of the first and second transport means, gating means disposed between the first and second transport means and operative in a first relationship to provide a transfer of cards from the first transport means to the second transport means and operative in a second relationship to provide a transfer of cards from the second transport means to the first transport means and operative in a third relationship to provide for a movement of cards with each transport means past the position of transfer to the other transport means, control means disposed relative to the cards in the input stacks for obtaining a controlled transfer of cards from the input stacks to the first transport means, means operative upon the cards transferred to the first transport means for sensing particular indications in the plurality on such cards, means including an output stack disposed relative to the cards on the first transport means to obtain a transfer to the output stack of cards moving with the first transport means past the position of transfer to the second transport means and of cards transferred to the first transport means from the second transport means, comparison means operatively coupled to the sensing means for comparing the particular indications sensed on the cards on the first transport means, means operatively coupled to the comparison means for producing an operation of the gating means in the first, second and third relationships upon the movement of the cards with the first and second transport means to the position for transfer by the gating means to the other transport means to obtain a transfer of first particular cards in each comparison to the output stack in accordance with the operation of the comparison means in each comparison and to retain second particular cards in each comparison on the transport means, and means operatively coupled to the comparison means for operating on the control means to obtain a controlled transfer of successive cards from paticular ones of the input stacks to the first transport means as a replacement for cards transferred to the output stack and in accordance with the operation of the comparison means and to provide a comparison of the particular indications on the successive cards with the particular indications on the second particular cards retained on the transport means.

23. In combination for use with a plurality of cards each having a plurality of bits of information, an input stack for holding the cards, transport means movable in closed loops and disposed relative to the input stack to facilitate a transfer of cards from the input stack to the transport means, means operatively coupled to the transport means for obtaining movements of the transport means in the closed loops, means including the transport means for imposing a force on the periphery of the transport means to obtain a removal of cards from the input stacks and to maintain such cards in fixed positioning on the transport means during the movement of the transport means, means responsive to the cards transferred to the transport means from the input stack for sensing particular bits of information on such cards, control means disposed in cooperative relationship with the cards in the input stack and the transport means and operative in a first relationship to prevent the transfer of cards from the input stack to the transport means against the force on the periphery of the transport means and operative in a second relationship to obtain a transfer of cards from the input stack to the transport means, means including electrical circuitry operatively coupled to the sensing means for processing the particular bits of information sensed on the cards, and means including electrical circuitry operatively coupled to the processing means for obtaining an operation of the control means in the first and second relationships at different times in accordance with the processed information to obtain a controlled transfer of cards from the input stack to the transport means.

24. In combination for use with a plurality of cards each having a plurality of bits of information, an input stack for holding the cards, movable transport means disposed relative to the input stack to facilitate a withdrawal of cards from the input stack to the transporting means such that the transport means are constructed to hold the cards in fixed position on the transport means for movement with the transport means, means operatively coupled to the transport means for obtaining a movement of the transport means, control means disposed in cooperative relationship with the input stack and the transport means and operative in a first relationship to prevent the transfer of cards from the input stack to the transport means against the force exerted to withdraw cards from the input stack to the transport means and operative in a second relationship to provide for a transfer of cards to the transport means from the input stack, means operative upon the cards transferred to the transport means for sensing particular bits of information on such cards, means responsive to the particular bits of information sensed on the cards for processing such information, and means operatively coupled to the processing means for obtaining an operation of the control means in the first and second relationships at particular times in accordance with the information processed on the cards to provide a controlled transfer of cards from the input stack to the transport means.

25. In combination for use with a plurality of cards each having a plurality of bits of information, first and second transport means each movable in closed loops and each constructed to retain cards on the transport means for movement with the transport means, means operatively coupled to the first and second transport means for obtaining movements of the first and second transport means in the closed loops, gating means operative in a first relationship to provide a transfer of cards from the first transport means to the second transport means and operative in a second relationship to provide a transfer of cards from the second transport means to the first transport means and operative in a third relationship to obtain a movement of cards with each of the transport means past the position of transfer by the gating means to the other transport means, means operatively coupled to the cards transferred to the first transport means for sensing particular bits of information on such cards, means responsive to the particular bits of information sensed on the cards moving with the first transport means for processing such particular bits of information, and means operatively coupled to the processing means for providing an operation of the gating means in the first, second and third relationships at different times in accordance with the information processed on the cards moving with the first transport means and upon the transport of the cards by each of the transport means to the position for transfer of the cards by the gating means to the other one of the transport means.

26. In combination for use with a plurality of cards each having a plurality of bits of information, first and second transport means movable in closed loops and constructed to maintain cards in fixed position on the first and second transport means for movement with the first and second transport means and disposed relative to each other to facilitate a transfer of cards between the first and second transport means, means operatively coupled to the first and second transfer means for obtaining a movement of the first and second transport means in the closed loops, means operatively coupled to the first and second transport means to maintain the cards in fixed positioning on the first and second transparent means during the movement of the first and second transport means, gating means disposed between the first and second transport means and operative in a first relationship to provide a coupled relationship between the first and second transport means for a transfer of cards from the first transport means to the second transport means and operative in a second relationship to provide a coupled relationship between the first and second transport means for a transfer of cards from the second transport means to the first transport means and operative in a third relationship to provide a decoupled relationship between the first and second transport means for a movement of cards with each transport means past the position of transfer to the other transport means, transducing means responsive to particular bits of information on the cards transferred to the first transport means for sensing such bits of information, and means including electrical circuitry operatively coupled to the transducing means for processing the particular bits of information sensed on the cards and for obtaining a controlled operation of the gating means in the first, second and third relationships in accordance with the processed information and upon the movement of the cards by each of the transport means to the position for the transfer of the cards by the gating means to the other one of the transport means.

27. In combination for use with a plurality of information cards disposed in at least a pair of input stacks and having a plurality of indications on each card to obtain a transfer of the cards in a selective order to an output stack, transport means for the cards such that the transport means are constructed to obtain a continuous movement of the cards by the transport means upon a transfer of the cards to the transport means, first control means operatively coupled to the cards in the input stacks for obtaining a controlled transfer of cards from the input stacks to the transport means for a continuous transport of the cards by the transport means, means operatively coupled to the cards being transferred to the transport means for sensing selective indications in the plurality on the cards, means responsive to the selective indications sensed on the cards for comparing such indications on the cards remaining on the transport means at each instant, second control means operatively coupled to the cards on the transport means and associated with the output stack for obtaining a transfer of cards from the transport means to the output stack, means responsive to the signals from the comparing means and operative upon the second control means for obtaining a controlled transfer of particular cards to the output stack from the transport means in each comparison and in accordance with the results of the comparison and for retaining other cards on the transport means in each comparison for the continuous transport of the cards by the transport means, and means responsive to the signals from the comparing means and coupled to the first control means for obtaining a controlled transfer of cards to the transport means from a particular one of the input stacks in each comparison and in accordance with the results of the comparison.

28. In combination for use with a plurality of information cards having a plurality of indications on each card and disposed in at least a pair of input stacks to obtain a transfer of the cards in a selective order to an output stack, transport means for the card such that the transport means are constructed to obtain a continuous movement of the cards by the transport means upon a transfer of the cards to the transport means, first control means operative upon the cards in the input stacks for obtaining a controlled transfer of cards in sequence from the input stacks to the transport means for the continuous transport of the cards by the transport means, second control means operative upon the cards on the transport means for obtaining a controlled transfer of cards from the transport means to the output stack, means operative upon the cards transferred from the input stacks to the transport means to sense selective indications in the plurality on such cards, means including electrical circuitry responsive to the selective information sensed on pairs of cards being transported at each instant for comparing such selective information to provide signal indications representing the relative values of such sensed information, means including electrical circuitry responsive to the signal indications from the comparing means to obtain an operation of the second control means in accordance with such signal indications for a transfer of a particular one of the cards in each pair to the output stack and for a continued and continuous transport of the second card in each pair by the transport means, and means including electrical circuitry responsive to the signal indications from the comparing means for operating upon the first control means to obtain a transfer to the transport means of a successive card from a particular one of the input stacks to provide a pair of cards with the second card on the transport means for purposes of comparison.

29. In combination for use with a plurality of cards each having a plurality of bits of information, an input stack constructed to hold cards in stacked relationship and to provide for a transfer of cards in sequence from the stack, transport means for the cards such that the transport means are constructed to obtain o continuous movement of the cards and being disposed relative to the cards in the input stack to facilitate a transfer of the cards from the input stack to the transport means, retaining means disposed relative to the cards in the input stack and operative in a first relationship to retain the cards in the input stack against the transfer of the cards from the input stack to the transport means and operative in a second relationship to provide for a transfer of cards in sequence from the input stack to the transport means for a continuous movement of the cards by the transport means, means responsive to selective bits of information on the cards transferred from the input stack for sensing such selective bits of information, means including electrical circuitry responsive to the selective bits of information sensed on the card transferred to the transport means for processing such information, and means including electrical circuitry responsive to the processed information and operatively coupled to the retaining means for obtaining an operation of the retaining means in the first and second relationships in accordance with such processed information to obtain a controlled transfer of cards from the input stack to the transport means.

30. In combination for use with a plurality of cards each having a plurality of bits of information, first and second transport means for the cards, gating means disposed between the first and second transport means and operative in a first relationship to provide a transfer of cards from the first transport means to the second transport means and operative in a second relationship to provide a transfer of cards from the second transport means to the first transport means, means responsive to selective bits of information on the cards on the first transport means for sensing such selective bits of information, and means responsive to the selective bits of information sensed on the cards on the first transport means for processing such selective bits of information and means responsive to the operation of the processing means for obtaining an operation of the gating means in the first and second relationships at different times in accordance with the processed information and upon a movement of the cards to the position for transfer by the gating means between the first and second transport means.

31. In combination for use with a plurality of cards each having a plurality of bits of information, first and second transport means for the cards such that the first and second transport means are constructed to obtain a transport of the cards, gating means operative in a first relationship to provide a transfer of cards from the first transport means to the second transport means and operative in a second relationship to provide a transfer of cards from the second transport means to the first transport means and operative in a third relationship to provide for a continued movement of cards on their respective one of the first and second transport means past the position of transfer by the gating means to the other one of the first and second transport means, transducing means responsive to selective bits of information on the cards on the first transport means for sensing such selective bits of information, means including electrical circuitry responsive to the selective bits of information sensed on the cards for processing such selective bits of information, and means including electrical circuitry responsive to the information processed on the cards on the first transport means for obtaining an operation of the gating means in the first, second and third relationships at different times in accordance with such processed information and upon the transport of the cards to the position for the transfer of the cards by the gating means between the first and second transport means.

32. In combination for use with at least first and second input stacks and with an output stack and with a plurality of information cards disposed in the input stacks and having a plurality of indications on each card, transport means for the cards such that the transport means are constructed to provide movements of the cards through at least first and second paths, transducing means responsive to particular indications in the plurality on the transported cards for sensing such particular indications, comparison means including electrical circuitry operatively coupled to the transducing means for comparing the particular indications sensed on successive pairs of transported cards to provide first control signals representing an inequality of one polarity between the particular information sensed on each pair of transported cards and to provide second control signals representing an inequality of an opposite polarity between the particular information sensed on each pair of transported cards, first and second retaining means respectively disposed relative to the cards in the first and second input stacks for providing a controlled transfer of cards from the first and second input stacks to the transport means, transfer means disposed relative to the transport means and the output stack for providing a controlled transfer from the transport means to the output stack of the cards moving along the first path past the position of transfer to the second path, gating means disposed relative to the cards on the transport means to obtain a controlled transport of cards along the first path and along the second path in accordance with the operation of the gating means, means including electric circuitry operatively coupled to the comparison means for operating upon the first and second retaining means to obtain a controlled transfer of cards from particular ones of the input stacks to the transport means in accordance with the production of the first and second control signals by the comparison means, and means including electrical circuitry operatively coupled to the comparison means for operating upon the gating means in accordance with the production of the first and second signals by the comparison means and upon transport of the cards to the position of transfer by the gating means to obtain a controlled transfer of a particular card in each pair from the first path to the second path and a transfer of the other card in the pair from the second path to the first path and transport of the other card in the pair on the first path past the position of retention to the second path, or to obtain a transfer of a particular card in the pair on the second path and a movement of the other card on the first path past the position of transfer to the second path.

33. In combination for use with at least first and second input stacks and with a single output stack and with a plurality of information cards disposed in the input stacks and having a plurality of indications on each card, transport means for the cards, control means disposed relative to the cards in the input stacks for providing a controlled transfer of cards from the input stacks to the transport means, gating means disposed relative to the cards on the transport means for controlling the length of travel of the transported cards from the first and second input stacks before transfer of the cards into the output stack, means disposed relative to the cards transferred to the transport means from the input stacks for sensing particular indications in the plurality on such cards, processing means including electrical circuitry operatively coupled to the sensing means for processing the particular indications sensed on successive pairs of transported cards, means including electrical circuitry operatively coupled to the processing means for operating upon the gating means to obtain an increased length of travel for a first particular one of the cards in each pair, means including electrical circuitry operatively coupled to the processing means for operating on the control means to obtain a controlled transfer to the transport means of cards from particular ones of the first and second input stacks in accordance with the signals produced by the processing means, and transfer means disposed relative to the cards on the transport means for obtaining a transfer into the output stack of the card other than the particular card in each pair.

34. The combination set forth in claim 33 in which the processing means includes means for comparing the particular indications sensed on successive pairs of cards to produce signals representing the results of such comparison and in which the transport means are movable in closed loops and are constructed to obtain movements of the cards with the transport means.

References Cited in the file of this patent

UNITED STATES PATENTS

| | | |
|---|---|---|
| 2,379,828 | Rubidge et al. | July 3, 1945 |
| 2,539,998 | Holland-Martin et al. | Jan. 30, 1951 |
| 2,620,924 | Kiesters | Dec. 9, 1952 |
| 2,686,052 | Winkler | Aug. 10, 1954 |
| 2,712,898 | Knutsen | July 12, 1955 |